(12) United States Patent
Guastella

(10) Patent No.: US 11,644,177 B1
(45) Date of Patent: May 9, 2023

(54) AMBIANCE LIGHTING SYSTEM AND METHOD

(71) Applicant: Teresa Marie Guastella, Clermont, FL (US)

(72) Inventor: Teresa Marie Guastella, Clermont, FL (US)

(*) Notice: Subject to any disclaimer, the term of this patent is extended or adjusted under 35 U.S.C. 154(b) by 0 days.

(21) Appl. No.: 17/549,973

(22) Filed: Dec. 14, 2021

(51) Int. Cl.
| | |
|---|---|
| *F21V 1/22* | (2006.01) |
| *F21V 1/06* | (2006.01) |
| *H05B 47/19* | (2020.01) |
| *F21V 5/04* | (2006.01) |
| *F21V 31/00* | (2006.01) |
| *F21L 4/08* | (2006.01) |
| *F21Y 115/10* | (2016.01) |
| *F21V 23/04* | (2006.01) |

(52) U.S. Cl.
CPC .................. *F21V 1/22* (2013.01); *F21L 4/08* (2013.01); *F21V 1/06* (2013.01); *F21V 5/045* (2013.01); *F21V 31/005* (2013.01); *H05B 47/19* (2020.01); *F21V 23/0435* (2013.01); *F21Y 2115/10* (2016.08)

(58) Field of Classification Search
CPC ..................................... F21V 1/22; F21V 1/06
See application file for complete search history.

(56) References Cited

U.S. PATENT DOCUMENTS

| | | | | |
|---|---|---|---|---|
| 5,791,774 A * | 8/1998 | Briles | ...................... | F21V 27/00 362/153.1 |
| 7,314,293 B2 * | 1/2008 | Steier | ...................... | F21S 13/12 40/554 |
| 7,591,565 B2 * | 9/2009 | Chadha | .................... | G09F 13/04 40/367 |
| 8,162,497 B2 * | 4/2012 | Gonzalez | ............... | G03B 15/02 362/17 |
| 9,568,174 B2 * | 2/2017 | Ng | ......................... | F21V 21/084 |
| 10,514,140 B2 * | 12/2019 | Sreshta | ................. | F21V 17/007 |
| 10,704,746 B2 * | 7/2020 | Jeong | ..................... | H05B 45/10 |
| 11,242,962 B2 * | 2/2022 | Stork | ....................... | F21S 9/037 |
| 11,248,755 B2 * | 2/2022 | Sreshta | .................... | F21V 3/026 |
| 2006/0044811 A1 * | 3/2006 | Ejnesman | ................. | F21V 1/08 362/351 |
| 2013/0235591 A1 * | 9/2013 | Smith | ....................... | F21V 1/22 362/311.03 |
| 2018/0135828 A1 * | 5/2018 | Minsky | ..................... | F21V 1/22 |
| 2018/0187869 A1 * | 7/2018 | Wiegel | .................. | F21V 17/105 |

* cited by examiner

*Primary Examiner* — Oluseye Iwarere
*Assistant Examiner* — Michael Chiang
(74) *Attorney, Agent, or Firm* — H. Brock Kolls

(57) ABSTRACT

The present invention relates to an ambiance lighting system that more than one of a translucent panel aligned and connected together to form a perimeter having a top edge, and an interior region. A light control panel comprises one or more light-emitting diode (LED), and a power source. One or more of a sleeve have an open edge, the light control panel slides into the open edge and is retained in the sleeve, the sleeve is secured across the top edge of the translucent panel, the light control panel is orientated within the sleeve so that the LED illuminate the interior region projecting light through the translucent panel creating an ambiance lighting effect. Exemplary embodiments include a handle for carrying, use of Fresnel lenses, and creating a kit of ambiance lighting system parts that a consumer can assemble.

20 Claims, 22 Drawing Sheets

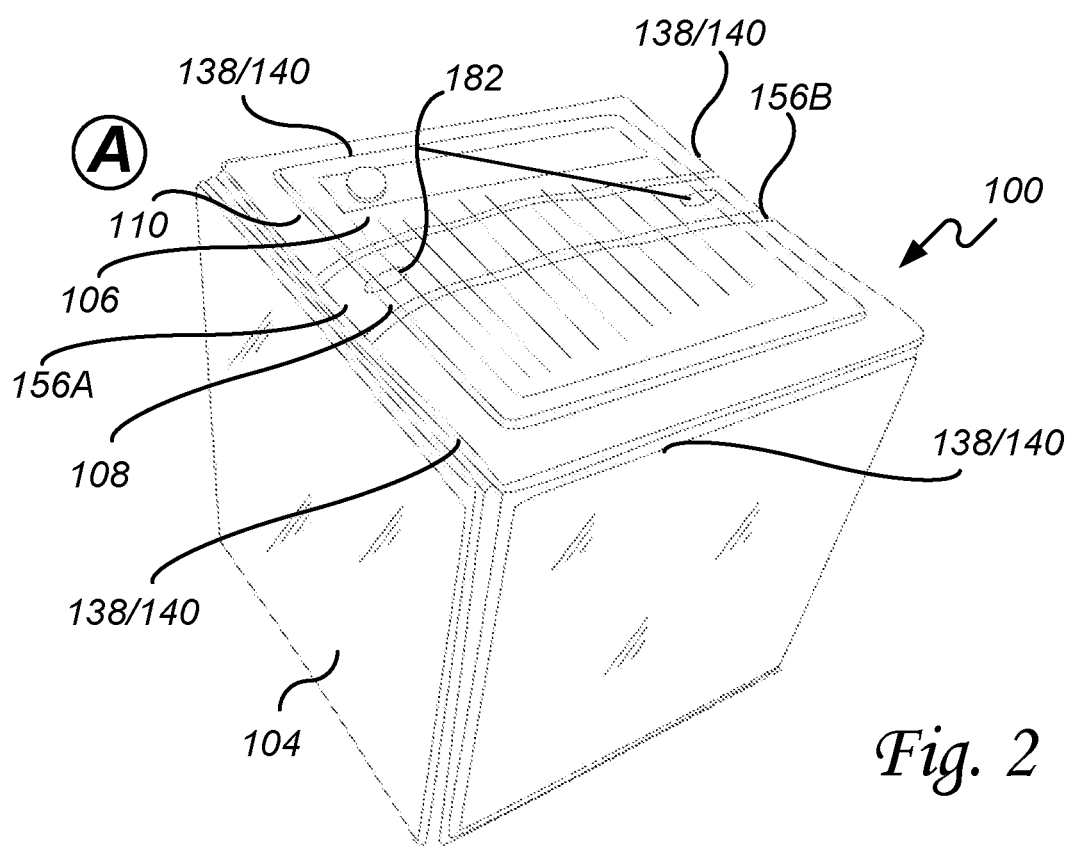
Fig. 2
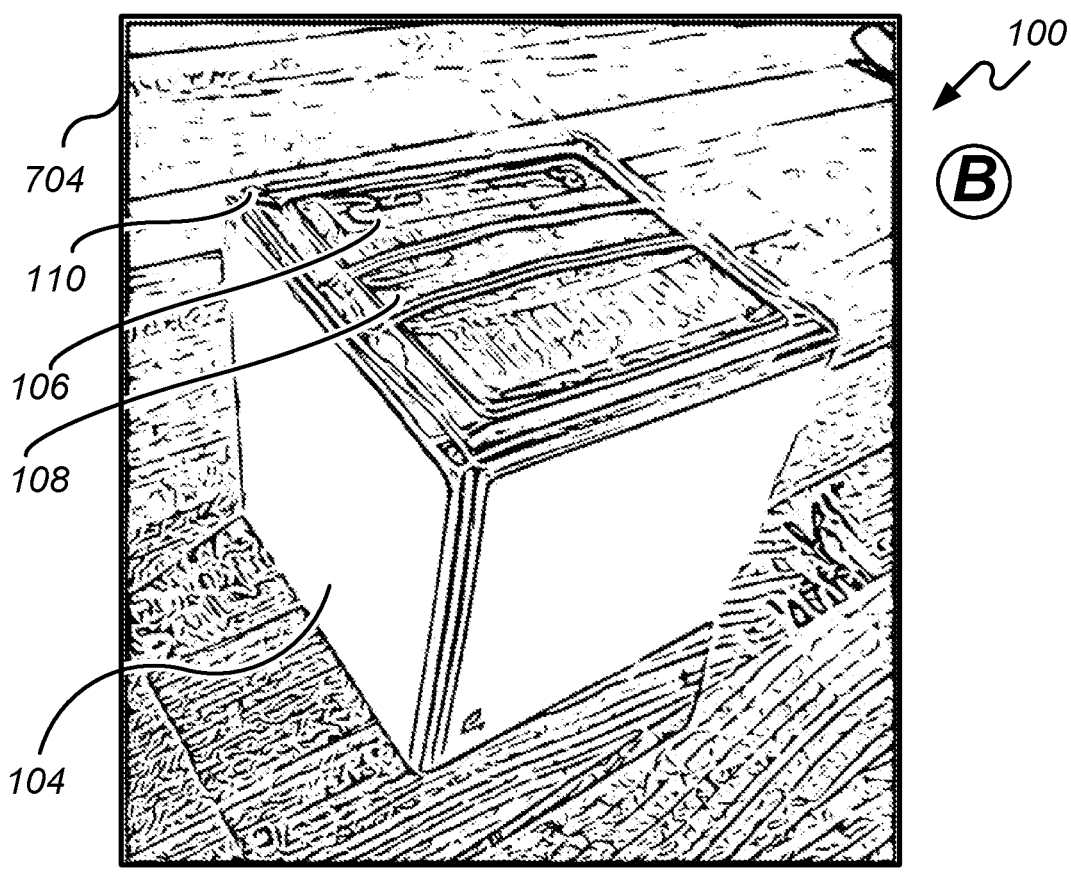

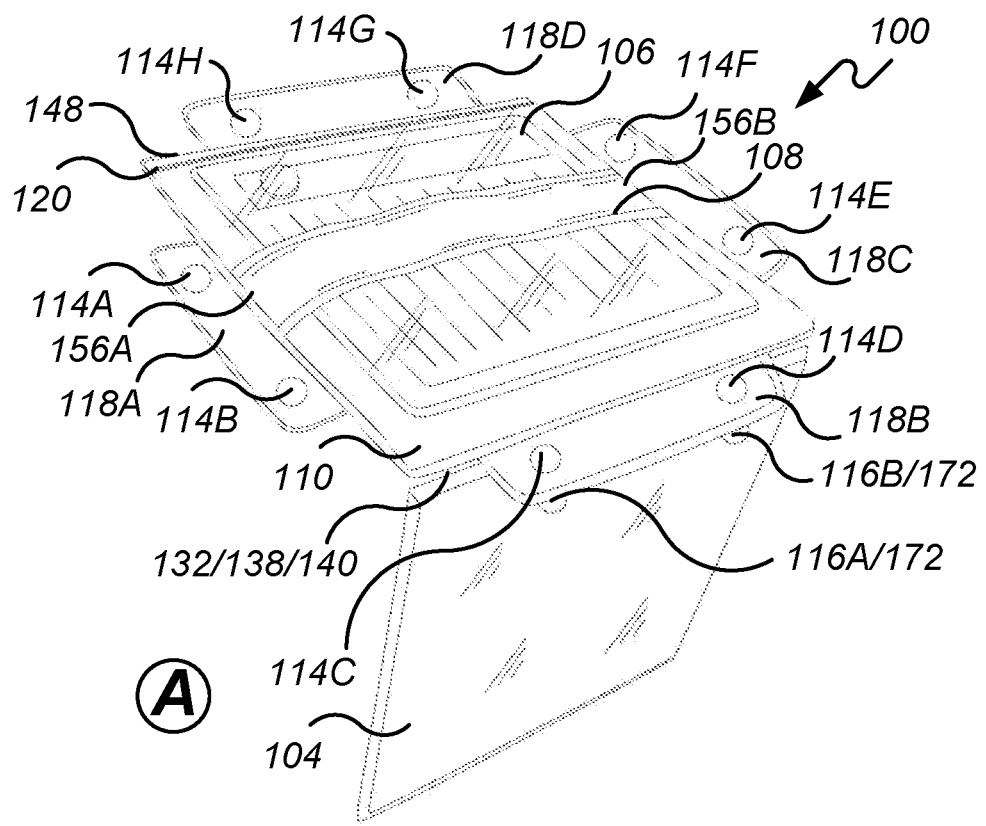
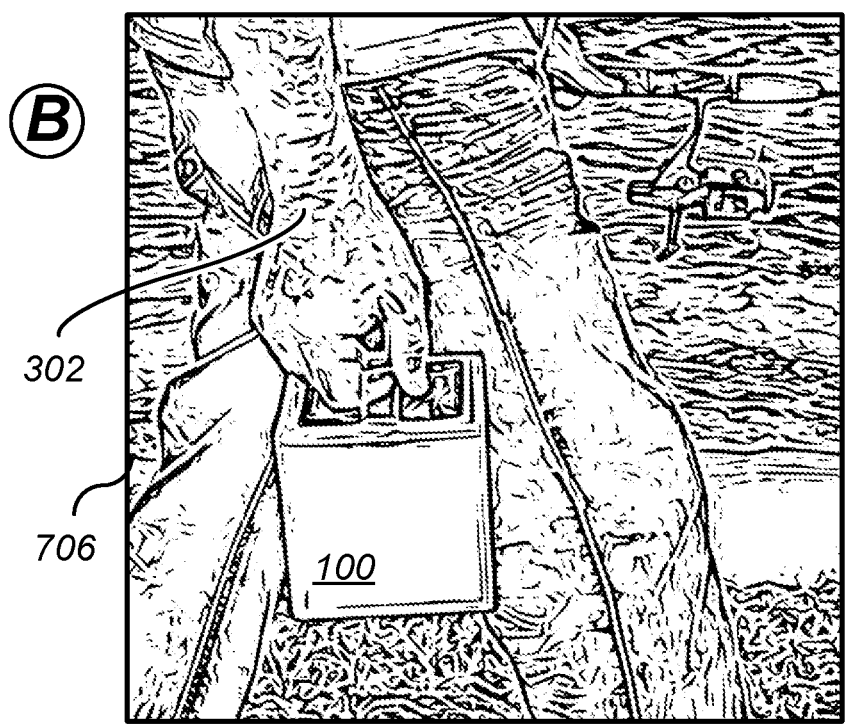
Fig. 3

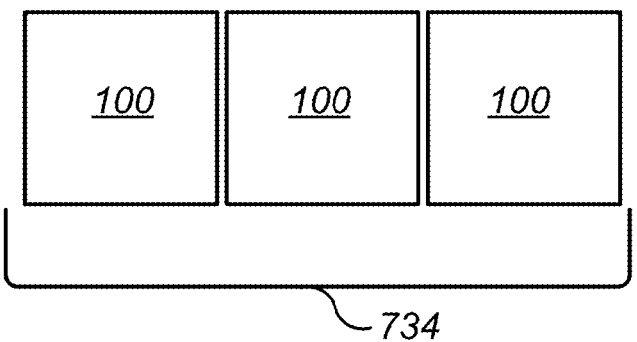
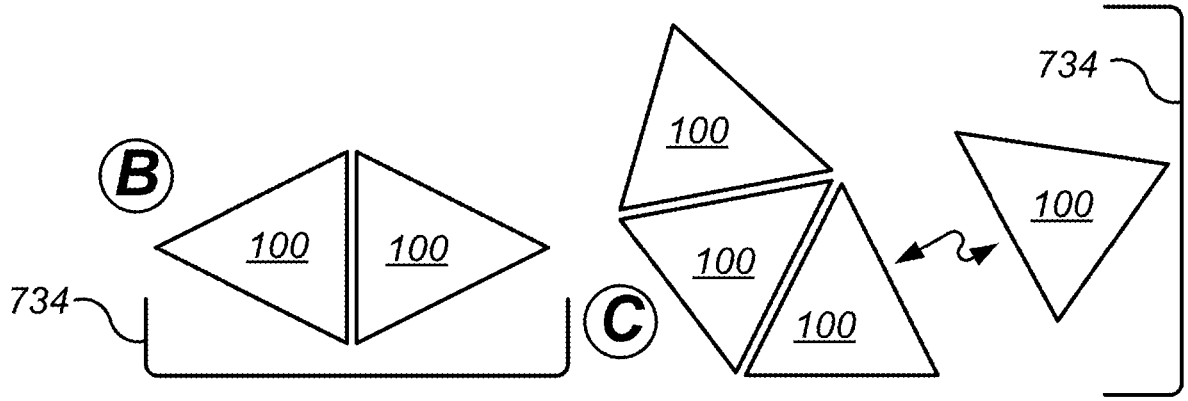
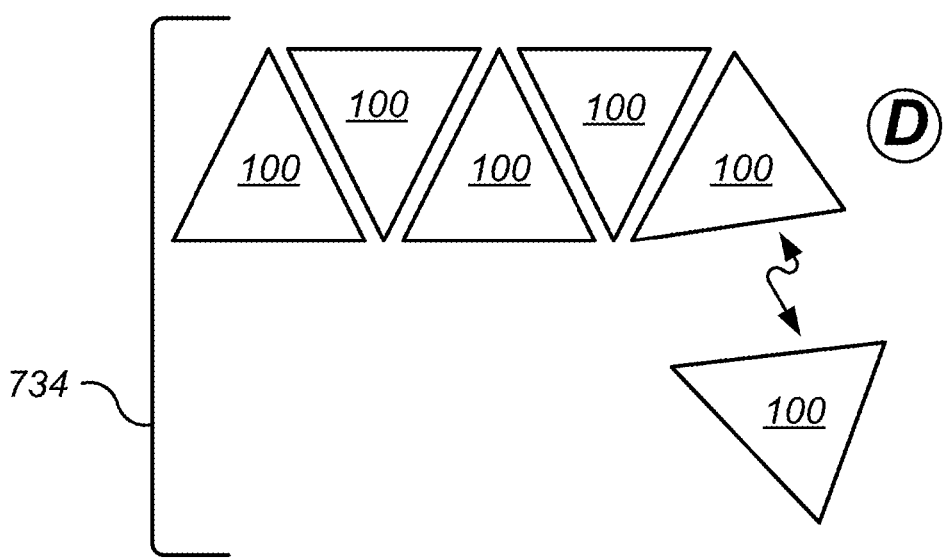
Fig. 7A

Fig. 7B
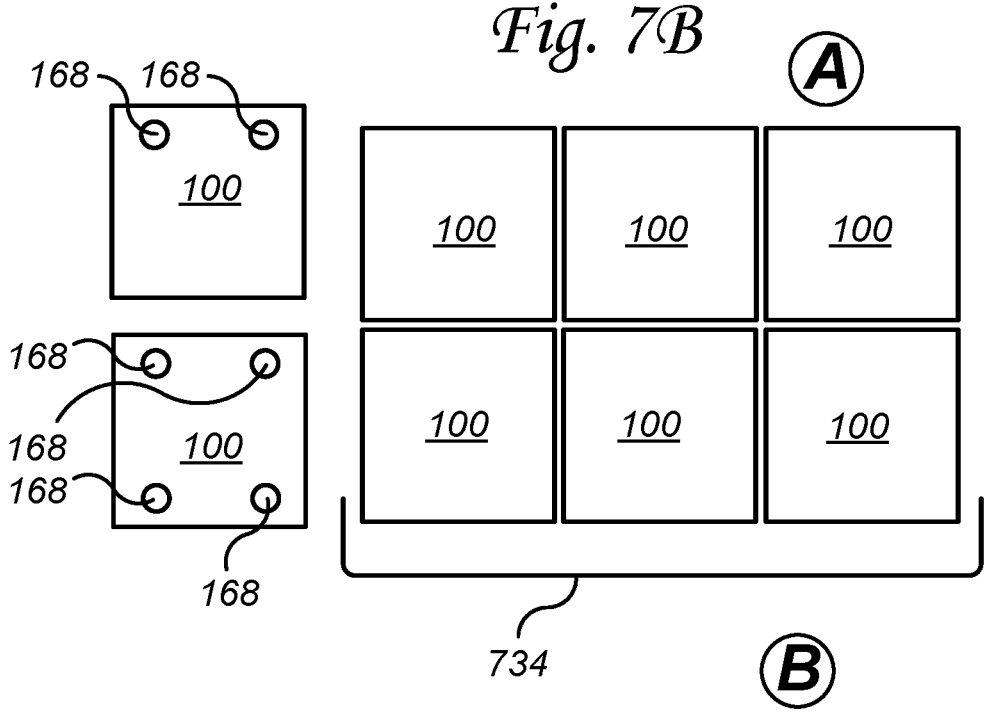
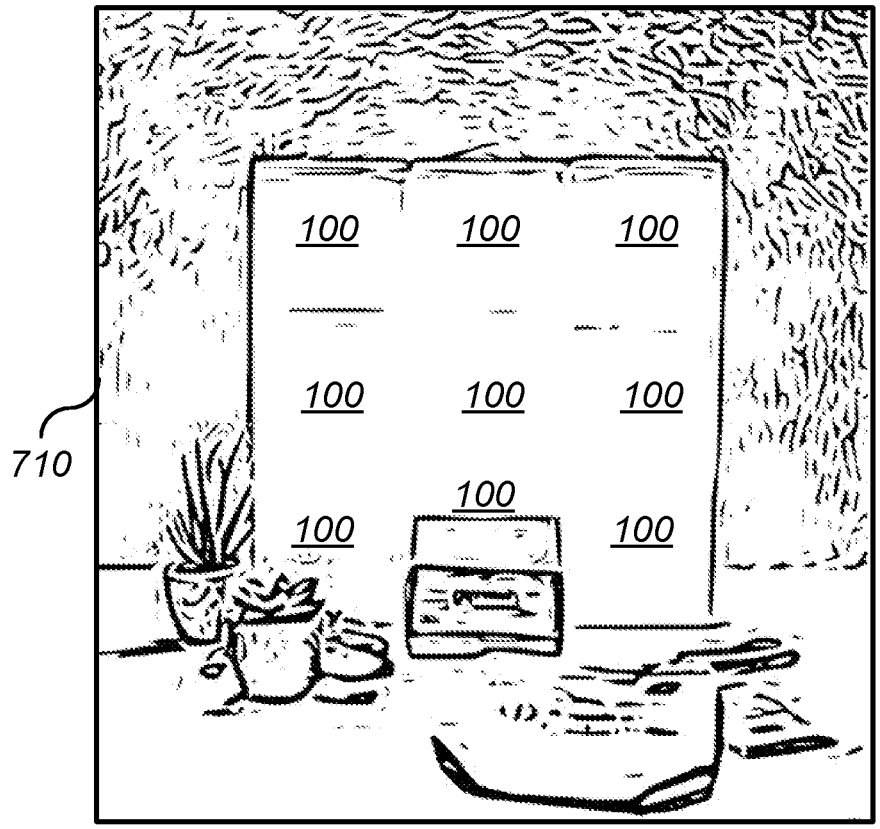

*Fig. 14*
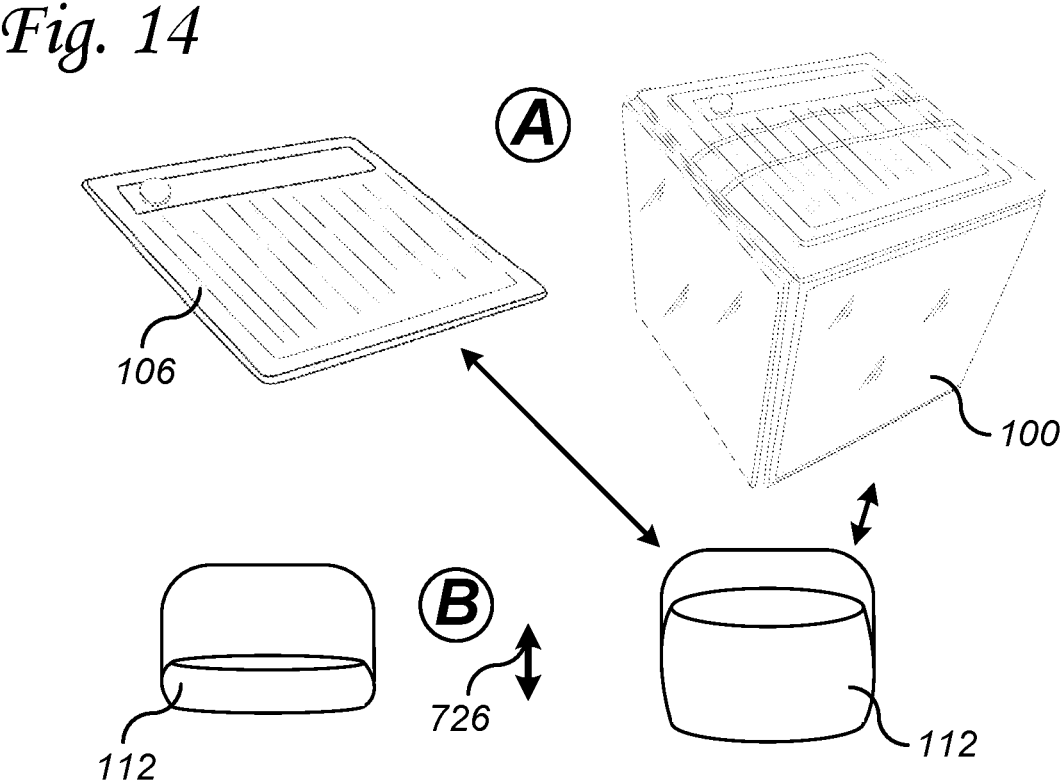

Fig. 15A
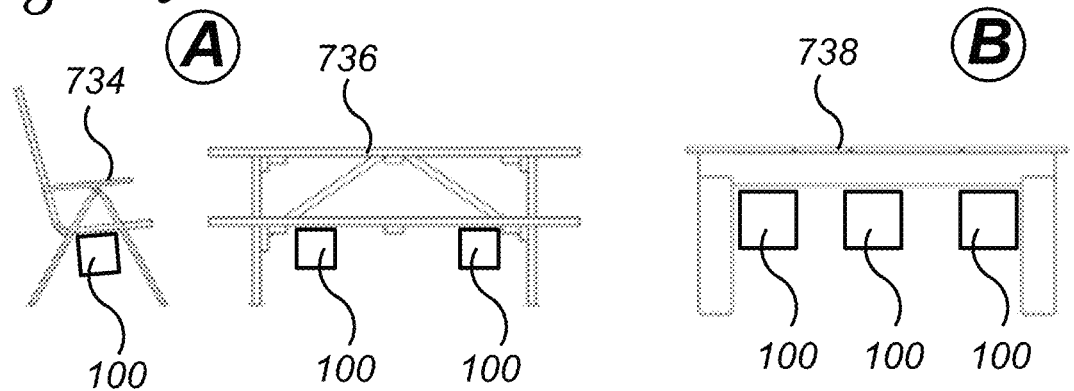
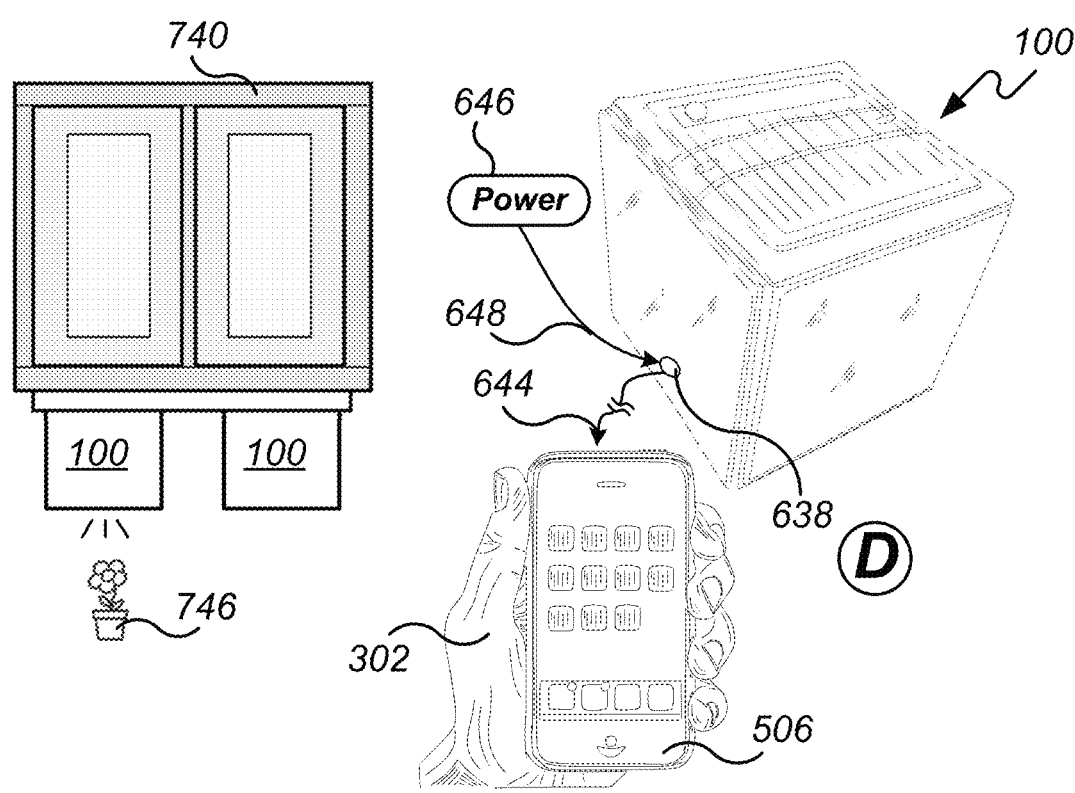

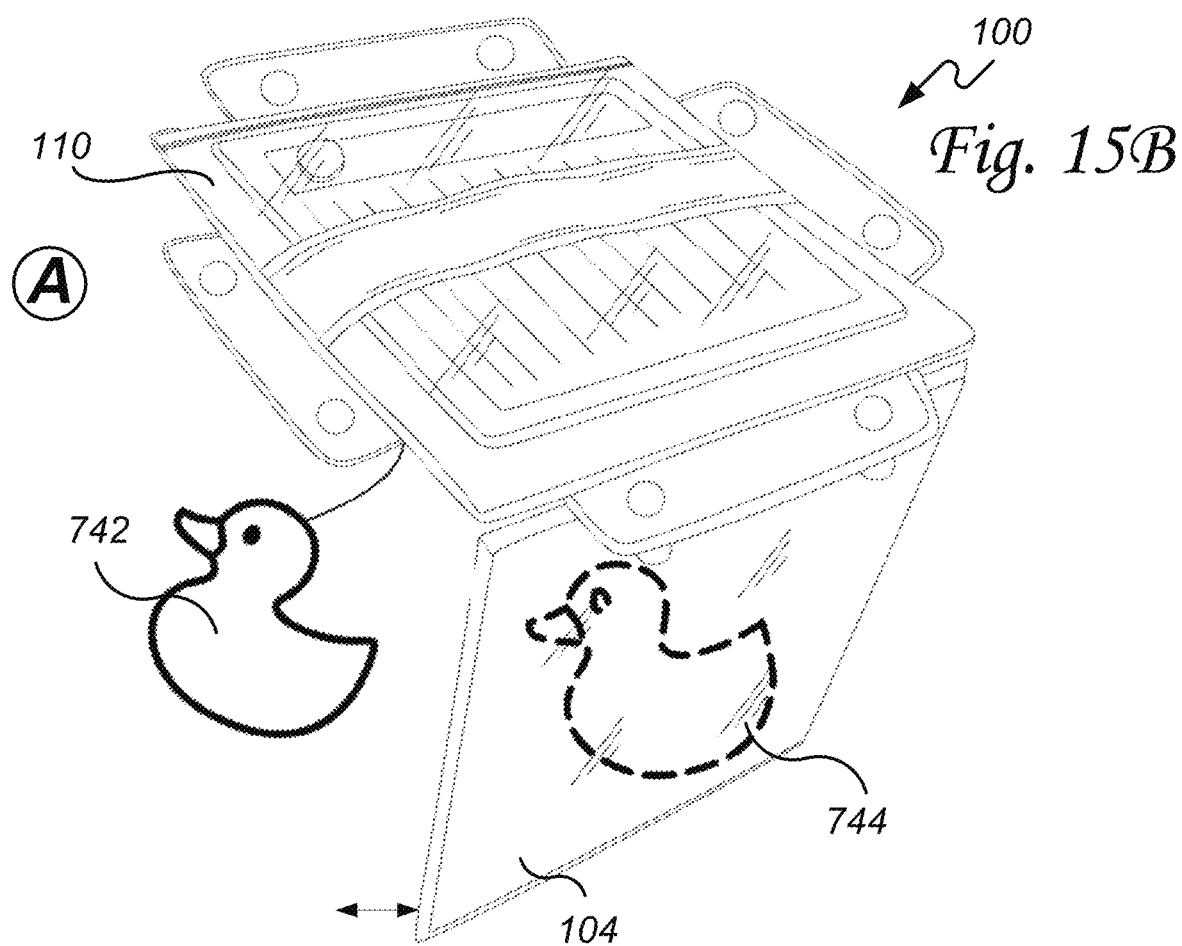
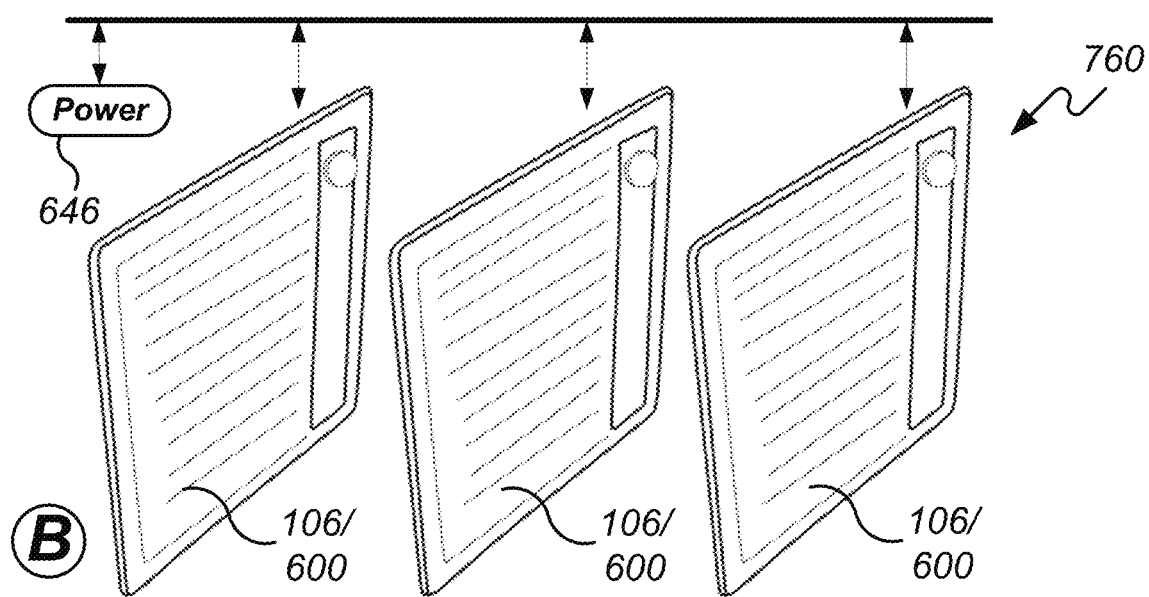
Fig. 15B

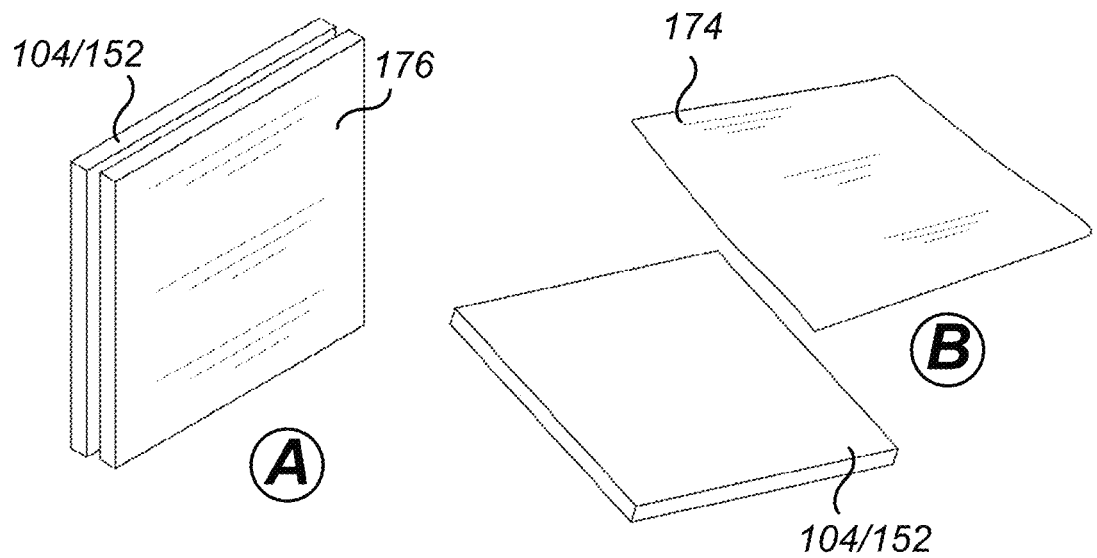
Fig. 16
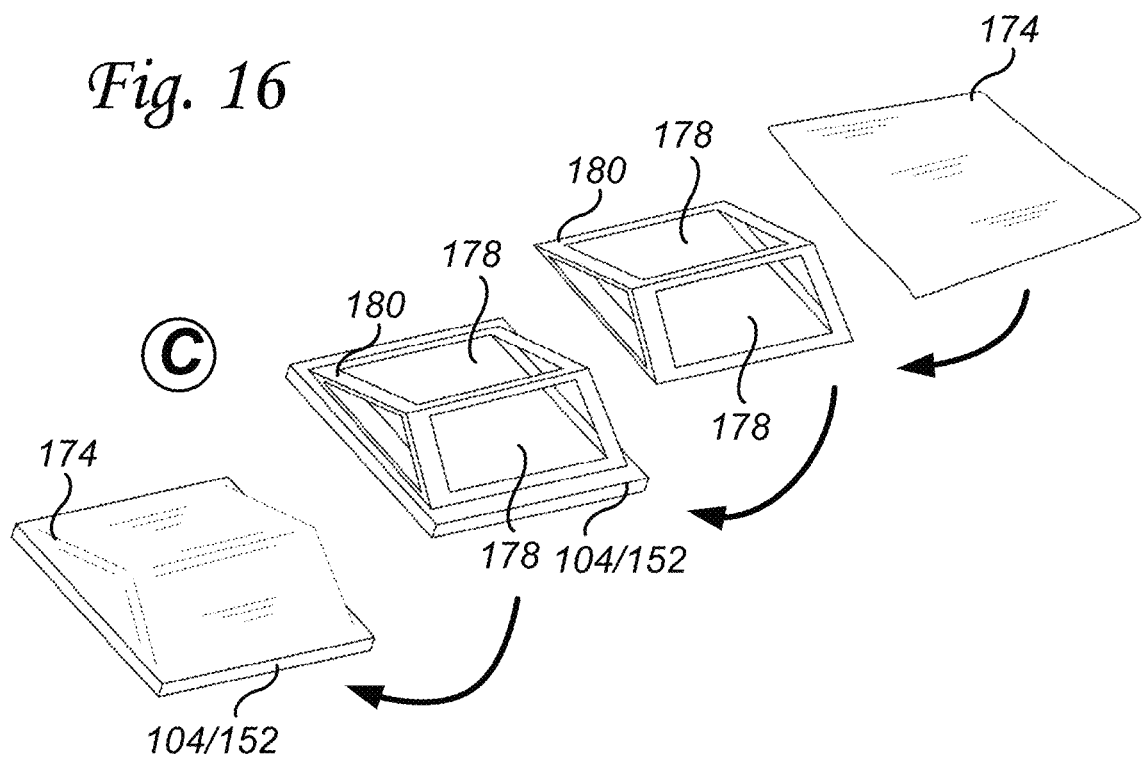

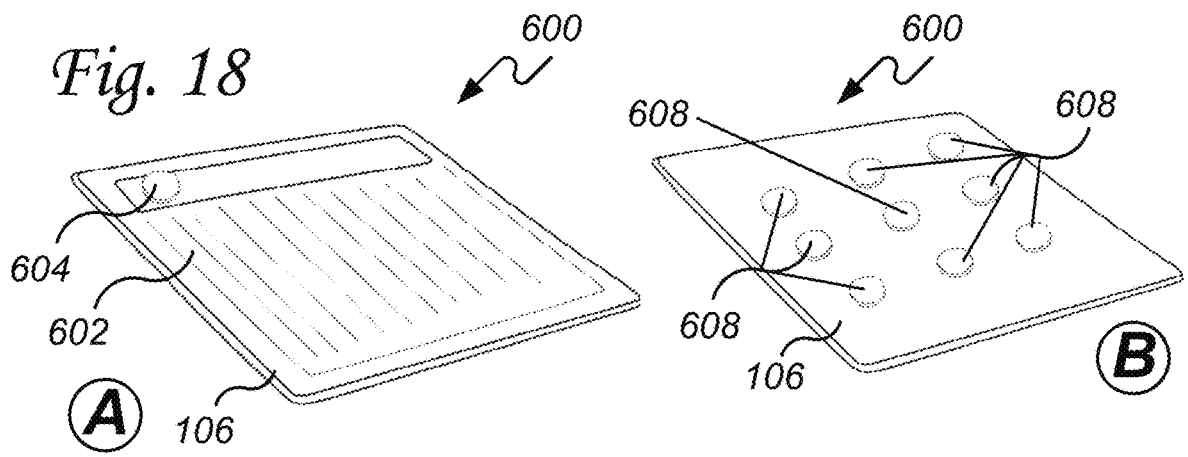
Fig. 18
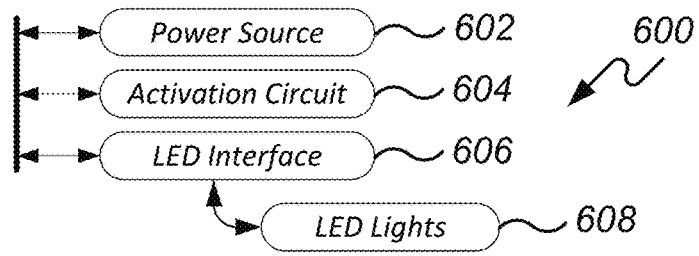
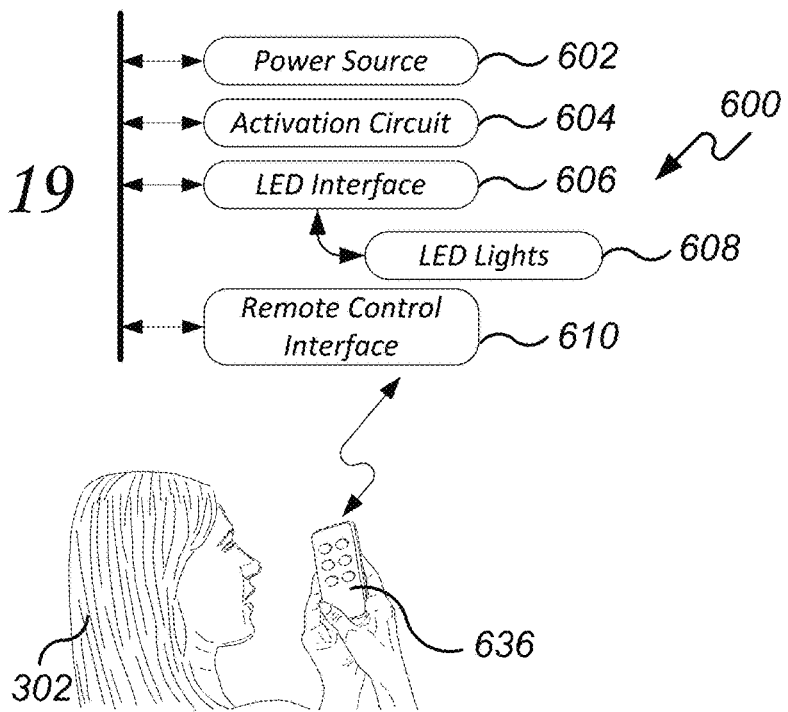
Fig. 19

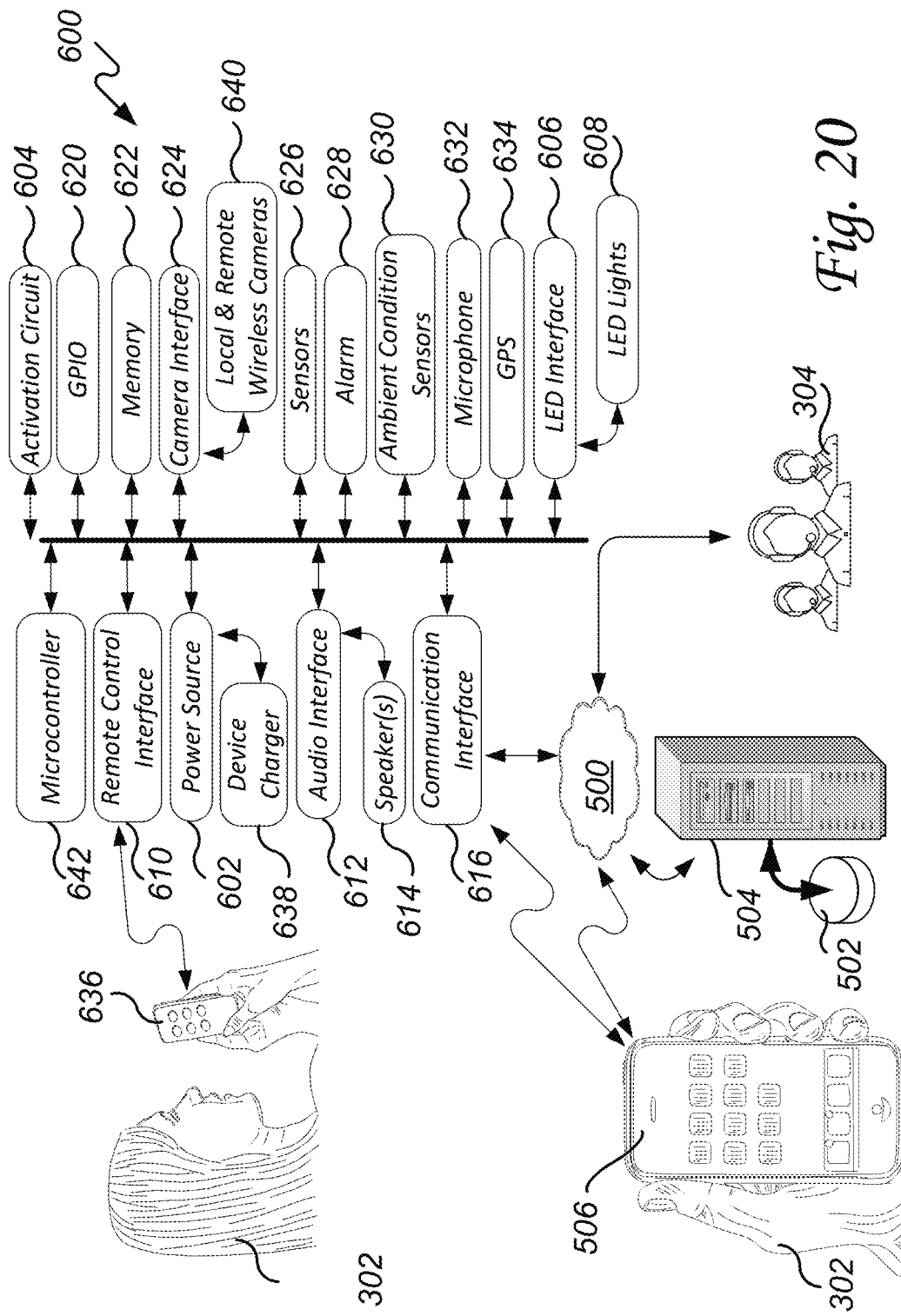

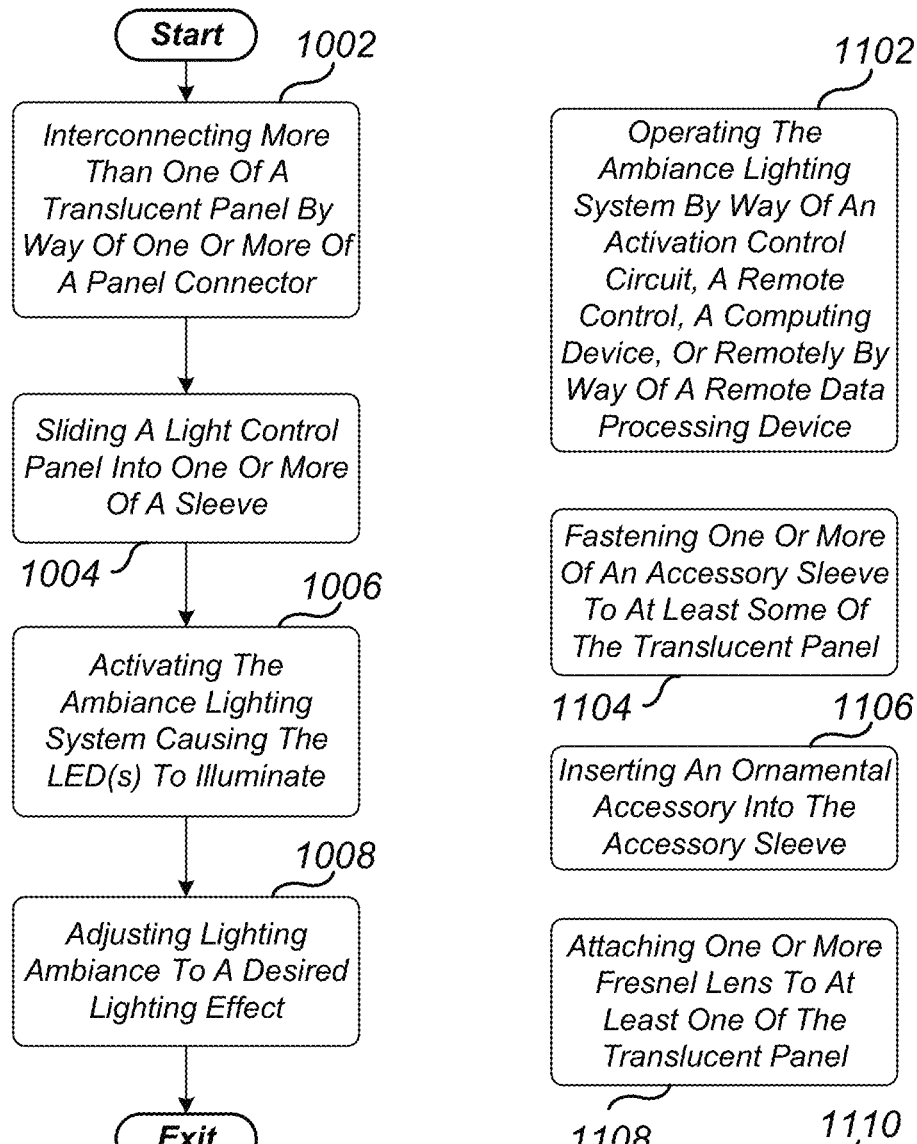

AMBIANCE LIGHTING SYSTEM AND METHOD

TECHNICAL FIELD OF THE INVENTION

This invention relates to an ambiance lighting system, and particularly to one or more translucent panels aligned and connected. A light control panel comprises one or more light-emitting diode (LED), and a power source such as a solar panel. The light control panel slides into a sleeve. The sleeve is secured across the top edge of the translucent panels. The LED(s) illuminate the interior region projecting light through the translucent panels creating an ambiance lighting effect.

BACKGROUND OF THE INVENTION

Before our invention adding accent lighting to event spaces and other places was difficult. Often the event is temporary and the environment is last-minute changeable and as such running cables can be impractical for such lighting needs. Also, lots of wires are unsightly and the presence of wired lighting in public places and event spaces can raise issues of adhering to electrical codes, union labor use requirements for lighting setup and teardown activities, and other compliance issues.

Another shortcoming is that often when the event space is set up the lighting needs to be adjusted based on the event type or style or the environment such as indoor versus outdoor to create the desired lighting effect. Lighting attributes such as color, color temperature, warmth, brightness, and other attributes are typically not available to change when using standard lighting and as such, it can be difficult to adjust the lighting to create the desired lighting ambiance.

Another shortcoming is that it can be difficult to integrate lighting that requires being wired into table centerpieces, artwork, home décor items, and other places. Running wires can be a complicated mess and detract from an otherwise beautiful accent piece.

The present invention addresses these and other shortcomings by providing a way to provide ambiance lighting in event places, entertaining spaces, home décor items, and in other places. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of an ambiance lighting system comprising more than one of a translucent panel aligned and connected to form a perimeter having a top edge, and an interior region. A light control panel comprises one or more light-emitting diode (LED), and a power source. One or more of a sleeve having an open edge, the light control panel slides into the open edge and is retained in the sleeve, the sleeve is secured across the top edge of the translucent panel, the light control panel is orientated within the sleeve so that the LED illuminate the interior region projecting light through the translucent panel creating an ambiance lighting effect.

Additional shortcomings of the prior art are overcome and additional advantages are provided through the provision of an ambiance lighting system comprising more than one of a translucent panel. One or more of a panel connector aligns and interconnects the translucent panel forming a perimeter having a top edge, a bottom edge, and an interior region. One or more of a light control panel comprising one or more light-emitting diode (LED), and a power source. One or more of a sleeve having an open edge, the light control panel slides into the open edge and is retained in the sleeve, the sleeve is secured across the top edge of the translucent panel, the light control panel is orientated within the sleeve so that the LED illuminate the interior region projecting light through the translucent panel creating an ambiance lighting effect.

Additional shortcomings of the prior art are overcome and additional advantages are provided through the provision of an ambiance lighting system kit comprising more than one of a translucent panel. One or more of an accessory sleeve secures to the surface of one or more of the translucent panels. One or more of a panel connector aligns and interconnects the translucent panel forming a perimeter having a top edge, a bottom edge, and an interior region. One or more of a light control panel comprising one or more light-emitting diode (LED), and a power source. One or more of a sleeve having an open edge, the light control panel slides into the open edge and is retained in the sleeve, the sleeve is secured across the top edge or the bottom edge, the light control panel is orientated within the sleeve so that the LED illuminate the interior region projecting light through the translucent panel creating an ambiance lighting effect.

Additional shortcomings of the prior art are overcome and additional advantages are provided through the provision of an ambiance lighting system method. The method comprises the step of interconnecting more than one of a translucent panel by way of one or more of a panel connector. The panel connector aligns and secures the translucent panel forming a perimeter having a top edge, a bottom edge, and an interior region.

Continuing with the step of sliding a light control panel into one or more of a sleeve, the sleeve has an open edge. The light control panel comprises one or more LED, a power source, and an activation control circuit. The light control panel slides into the open edge and is retained in the sleeve. The sleeve is secured across the top edge or the bottom edge. The light control panel is orientated within the sleeve so that the LED(s) illuminate the interior region projecting light through the translucent panel creating an ambiance lighting effect.

Continuing with the steps of activating the ambiance lighting system by way of the activation control circuit causing the LED(s) to illuminate, and adjust the lighting ambiance to the desired lighting effect.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of a sleeve and light control panel;

FIG. 3 illustrates one example of a consumer carrying an ambiance lighting system;

FIGS. 7A-7B illustrate examples of a plurality of ambiance lighting systems being interconnected forming ambiance lighting clusters effects;

FIGS. 12-14 illustrates examples of ambiance lighting systems being inserted into secondary lighting fixtures. In exemplary embodiments plexiglass protection, or similar material, can be attached to the secondary lighting fixture where solar panels are inserted into a sleeve;

FIGS. 15A-D illustrates examples of applications of an ambiance lighting system;

FIG. 16 illustrates examples of mirrored translucent panels;

FIGS. 18-20 illustrates examples of a light control panel;

FIG. 21 illustrates one example of an ambiance lighting system method; and

FIG. 22 illustrates an exemplary embodiment of an ambiance lighting system method.

The detailed description explains the preferred embodiments of the invention, together with advantages and features, by way of example with reference to the drawings.

DETAILED DESCRIPTION OF THE INVENTION

In the present invention "ambiance" is intended to mean the character and atmosphere of a place such as a room, event space, patio area, pool area, reception room, and/or other places. Furthermore, "ambiance lighting" is intended to mean lighting that contributes to creating the character and atmosphere of the place. In this regard, the ambiance lighting system in the present invention is a carefully engineered lighting system and method of use that easily integrates into environments such as table centerpieces, pathway lighting, ornamental displays, patio spaces, event spaces, art décor features, charging station applications, furniture under-lighting on picnic tables, benches, cabinets, and other furniture under-lighting applications, secondary lighting fixtures such as lamps, chandeliers, and other secondary lighting fixtures. And numerous other environments and applications where the ambiance lighting effect enhances the character and atmosphere of a place.

An advantage in the present invention is that the ambiance lighting system controls the light brightness, color, color temperature, and other ambiance attributes associated with the light quality, warmth, color palette, luminance, and other ambiance lighting attributes.

Figure 1:
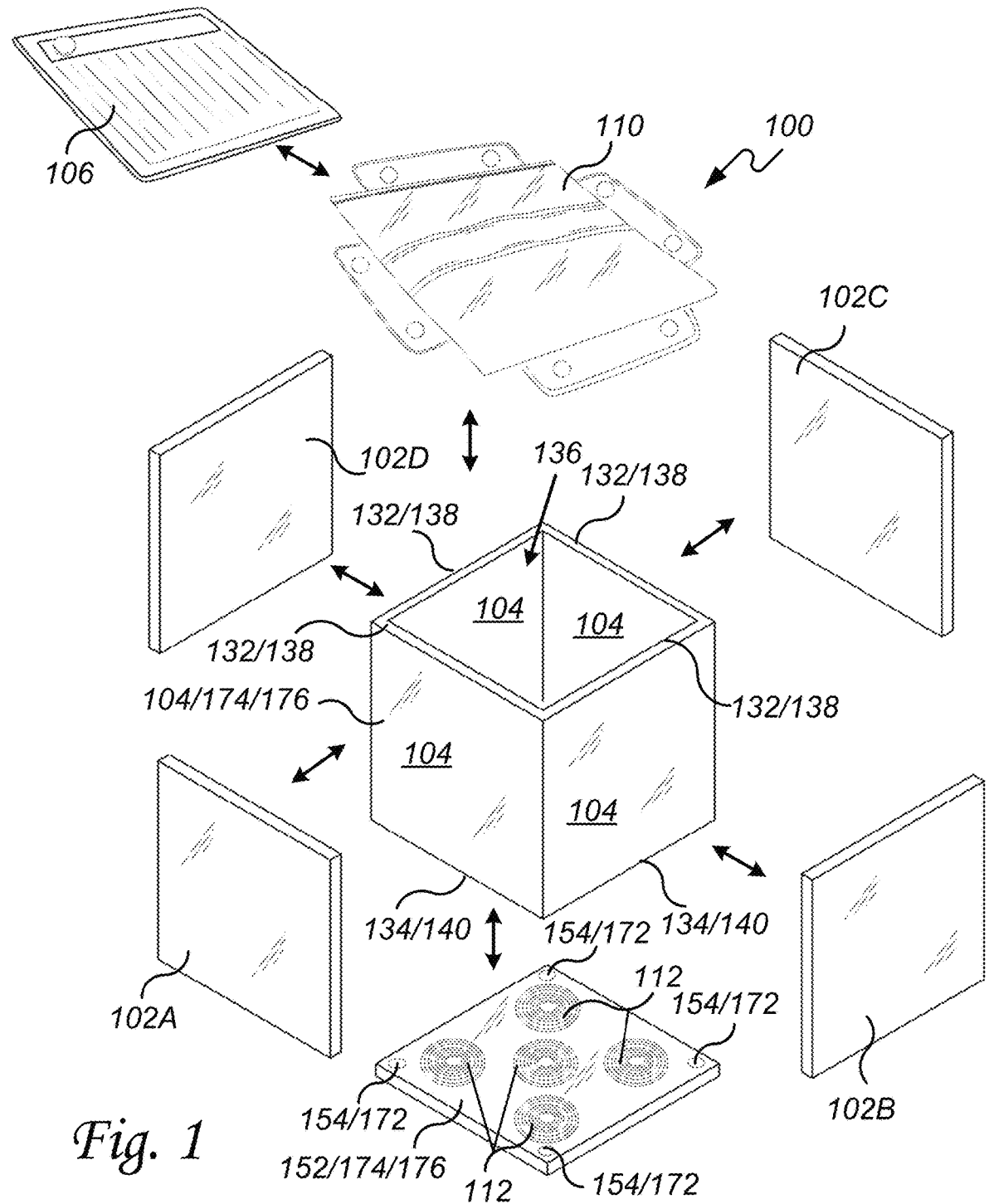
FIG. 1 illustrates one example of an ambiance lighting system.

Turning now to the drawings in greater detail, it will be seen that in FIG. 1 there is illustrated one example of an ambiance lighting system 100. In an exemplary embodiment, an ambiance lighting system 100 can comprise more than one of a translucent panel 104 that are aligned and connected to form a perimeter 132 having a top edge 138, a bottom edge 140, a bottom perimeter edge 134, and an interior region 136.

As better illustrated in at least FIG. 18, a light control panel 106 can comprise one or more light-emitting diode (LED) 608, a power source 602, and an activation control circuit 604.

As better illustrated in at least FIG. 3, one or more of a sleeve 110 has an open edge 148. The light control panel 106 slides into the open edge 148 and is retained in sleeve 110. The sleeve 110 is secured across the top edge 138 or the bottom edge 140.

The light control panel 106 is orientated within the sleeve 110 so that the LED(s) 608 illuminate the interior region 136 projecting light, when the sleeve 110 is secured across the top edge 138 towards the bottom edge 140 or when the sleeve 110 is secured across the bottom edge 140 towards the top edge 138, and through the translucent panels 104 creating an ambiance lighting effect.

In another exemplary embodiment, an ambiance lighting system 100 can comprise more than one of a translucent panel 104. As better illustrated in at least FIG. 5, one or more of a panel connector 124/126/150/182 aligns and interconnects the translucent panel 104 forming a perimeter 132 having a top edge 138, a bottom edge 140, a bottom perimeter edge 134, and an interior region 136.

As better illustrated in at least FIG. 18, a light control panel 106 comprises one or more LED 608, a power source 602, and an activation control circuit 604. As better illustrated in at least FIG. 3, one or more of a sleeve 110 has an open edge 148. The light control panel 106 slides into the open edge 148 and is retained in sleeve 110. The sleeve 110 is secured across the top edge 148. The light control panel 106 is orientated within the sleeve 110 so that the LED(s) 608 illuminate the interior region 136 projecting light, when the sleeve 110 is secured across the top edge 138 towards the bottom edge 140 or when the sleeve 110 is secured across the bottom edge 140 towards the top edge 138, and through the translucent panels 104 creating an ambiance lighting effect.

The translucent panels 104 can be made from one or more of the following materials: polycarbonate, plastic, Plexiglass, Lexan, Acrylic, acrylonitrile butadiene styrene (ABS), glass, fabric, recycled materials, or other suitable materials as may be required and/or desired in a particular embodiment. Additionally, a top panel 110 and a bottom panel 152 can be clear or translucent and can be made from one or more of the following materials: polycarbonate, plastic, Plexiglas, Lexan, Acrylic, ABS, glass, fabric, recycled materials, or other suitable materials as may be required and/or desired in a particular embodiment.

In an exemplary embodiment, one or more of a Fresnel lens 112 is secured across the bottom edge 140. The Fresnel lens 112 projects patterns of light onto surfaces proximate to the ambiance lighting system 100. The Fresnel lens can be applied to a bottom panel 152. The bottom panel 152 can further comprise bottom panel fasteners 154 that secure the bottom panel to the bottom edge of the translucent panels 104.

Such bottom panel fasteners 154 can be magnets, hook-and-loop, adhesive tapes or films, or other types and kinds of fasteners as may be required and/or desired in a particular embodiment. Depending on the types of bottom panel fasteners 154 used, the bottom panel fasteners 154 can be surface applied to the for hook-and-look, adhesive film, and similar types of panel fasteners or press-fit or otherwise embedded into the bottom panel 152 for magnets, and other similar panel fasteners.

The translucent panels 104 or bottom translucent panel 152 can have de-embossed recesses/fastener holes 172 where the panel fasteners 116/154 can be located, fitted, press-fitted, or secured in other ways as may be required and/or desired in a particular embodiment.

In an exemplary embodiment, the sleeve 110 can be fabricated from a clear material. When solar panels are used as part of the power source 602, a clear material used for the sleeve 110 allows sunlight to reach the solar panels which are part of the light control panel 106. Additionally, a clear material used for sleeve 110 allows the light generated by the LED(s) which are part of the light control panel 106 and secured inside the sleeve 110 to radiate light mostly unobstructed and not occluded into the inner region 136. The injecting of the high-quality light into the inner region 136 projects light through the translucent panels 104 to create the ambiance lighting effect.

In an exemplary embodiment, one or more of an accessory sleeve 102 can be secured to the surface of one or more of the translucent panel 104. In this regard, as better illustrated in at least FIG. 4, the access sleeve 102 is configured such that an ornamental accessory 158 can be slid into the accessory sleeve 102. In operation, the ornamental accessory 158 has a plurality of apertures therethrough and slides into the accessory sleeve 102. The ambiance lighting system 100 backlights the ornamental accessory 158 creating the desired ambiance lighting effect.

In an exemplary embodiment, the sleeve 110 and the accessory sleeve 102 can be made from a clear material such as one or more of the following materials: plastic, vinyl, glass, or suitable type or kind of materials as may be required and/or desired in a particular embodiment.

Referring to FIG. 2, there is illustrated one example of a sleeve 110 and light control panel 106. In an exemplary embodiment, reference 'A' illustrates how a light control panel 106 comprising one or more LED(s) 608, the power source 602, and the activation control circuit 604 is slipped into the sleeve 110, and then the combination is secured to the top edge 138. Alternatively, the combination can be secured to the bottom edge 140.

A handle 108 can be fastened at each end 156A and 156B and spans the sleeve 110 so that a consumer 302 can carry the ambiance lighting system 100. One or more hanging holes 182 can be cut into the handle. The hanging holes 182 can be used to tie a string, wire, cord, or other suitable hanging material through the hanging holes 180 to effectuate the ability to hang the ambiance lighting system 100. Reference '13' illustrates photo 704 of an ambiance lighting system 100 with the sleeve 110 and lighting control panel 106 attached to the translucent panels 104.

Referring to FIG. 3, there is illustrated one example of a consumer 302 carrying an ambiance lighting system 100. In an exemplary embodiment, reference 'A' illustrates the sleeve 110 further comprising a seal 120 along the open edge 148 that when closed creates a water resistance environment around the light control panel 106. In this regard, sleeve 110 can comprise at least two layers of material sealed along three edges leaving one open edge 148. The sleeve 110 forming a pocket allows the lighting control panel 106 to be slipped into sleeve 110. The seal 120 can then be pressed sealing firmly by the consumer 302 to close the seal in a zip-lock type fastener or other suitable fastener type and/or manner as may be required and/or desire in a particular embodiment. Once sealed the lighting control panel 106 is in a water-resistant environment. The sleeve 110 can be made of multiple clear layers of the material that allows the sunlight to reach a solar panel which in certain embodiments can be part of the power source 602. The solar panel recharges the batteries by way of the sun or external light source that powers the lighting control board 106 and/or powers the lighting control board 106 directly. The clear layer material also allows the consumer 302 to see through to the lighting control panel 106 to activate by touching the activation circuit 604. Alternatively, consumer 302 can use a remote-control 636 to operate the ambiance lighting system 100. Such manual touch or wireless remote operation causes light generated by the LED(s) to be broadcast into the interior region 136 of the translucent panels 104.

In an exemplary embodiment, at least some of the translucent panels 104 can comprise panel fasteners 116A and 116B. Furthermore, sleeve 110 can have one or more flaps 118A, 118B, 118C, and 118D that extend beyond the perimeter 132 across the top edge 138 or the bottom edge 140 as needed in a particular embodiment. The flaps 118A, 118B, 118C, and 118D can have fasteners 114A-H that mate with the panel fasteners 116A-B. While one translucent panel 104 is illustrated in FIG. 3 reference 'A', other translucent panel 104 can be combined to form perimeter 132. The combination of translucent panels 104 can be similarly be equipped with panel fasteners 116A-B securing the sleeve 110 to the top edge 138 or bottom edge 140 of each of the translucent panels.

In an exemplary embodiment, the fastener 114A-H and panel fasteners 116A-B can be magnets, hook-and-loop, adhesive tapes or films, or other types and kinds of fasteners as may be required and/or desired in a particular embodiment.

A handle 108 can be fastened at each end 156A and 156B and span the sleeve 110 so that a consumer 302 can carry the ambiance lighting system 100 as illustrated in reference 'B' photo 706. In an exemplary embodiment, the handle 108 can be fabricated from the same clear material as the sleeve 110 and can be one or more of the following materials: plastic, vinyl, glass, or suitable types and kinds of materials as may be required and/or desired in a particular embodiment.

Figure 4:
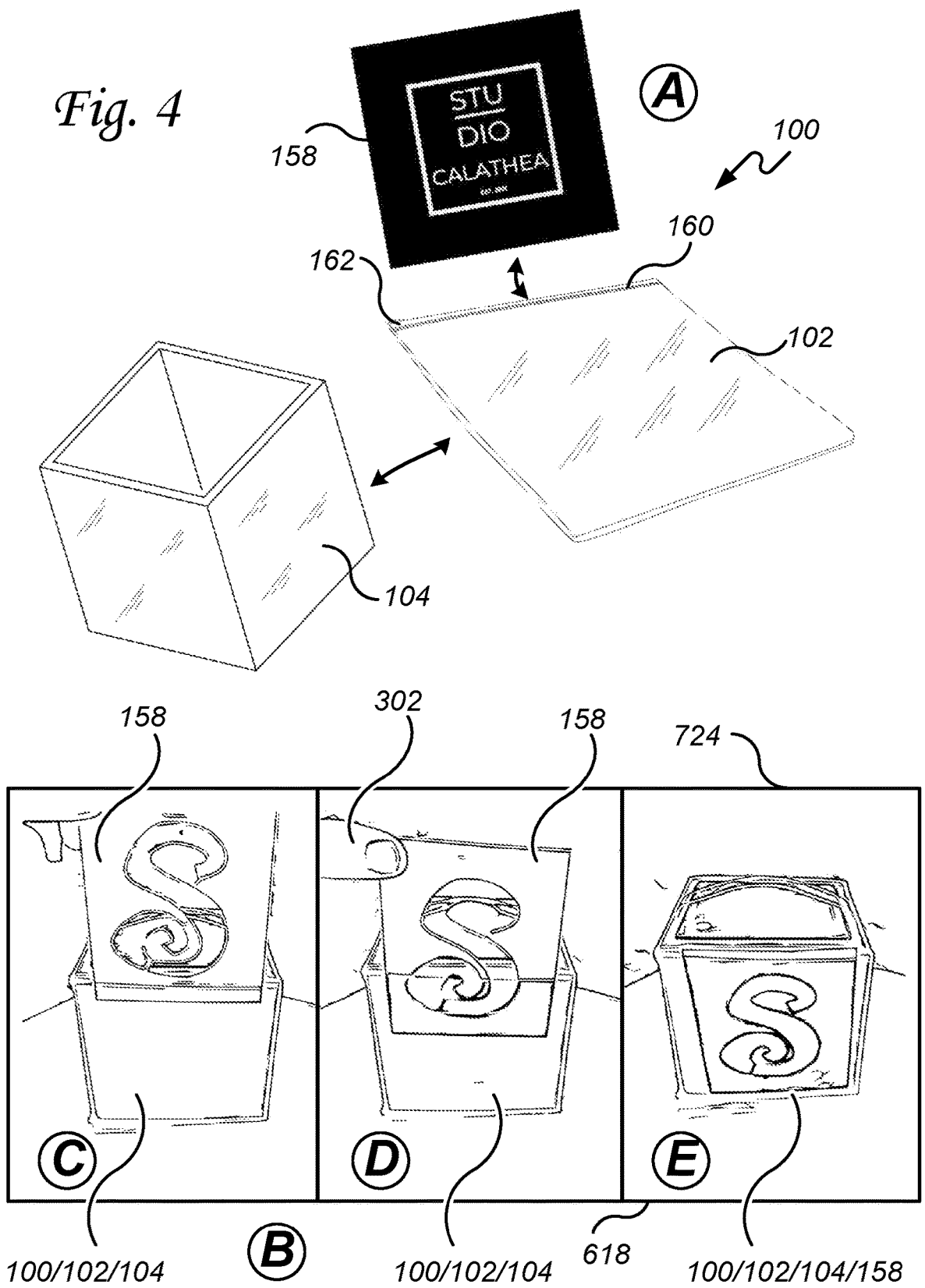
FIG. 4 illustrates one example of an accessory sleeve and an ornamental accessory.

Referring to FIG. 4, there is illustrated one example of an accessory sleeve 102 and an ornamental accessory 158. In an exemplary embodiment, an ornamental accessory 158 can be thin made of paper, metal, or other material and have a plurality of apertures punch therethrough to create a unique pattern, shape, indicia, or other ornamental design. As an example, illustrated in FIG. 4 is an ornamental accessory 158 with the indicia STUDIO CALATHEA punched therein. Thin in nature the ornamental accessory 158 can slide into the accessory sleeve 102, open edge 162.

The accessory sleeve 102 can be fabricated similarly to sleeve 110. In this regard, the accessory sleeve 102 can be fabricated from clear material so that the ornamental accessory 158 is viewable through the accessory sleeve 102 and backlit from the LED(s) 608.

In an exemplary embodiment, the accessory sleeve 158 clear material can be one or more of the following materials: plastic, vinyl, glass, or suitable type or kind of materials as may be required and/or desired in a particular embodiment.

FIG. 4, reference 'B' illustrates a photo 724 showing in operation a consumer 302 sliding an ornamental accessory 158 into an accessory sleeve 102. In this regard, illustrated as references 'C', 'D', and 'E' is a progression, showing the consumer 302 sliding an ornamental accessory 158 into an accessory sleeve 102. The accessory sleeve 102 is fastened to a translucent panel 104 which is part of an ambiance lighting system 100.

The accessory sleeve 102 can comprise an accessory seal 160 that is similar to seal 120 along the open edge 162 that when closed creates a water resistance environment around the ornamental accessory 158. In this regard, the accessory sleeve 102 can comprise at least two layers of material sealed along three edges leaving one open edge 162. The accessory sleeve 102 forming a pocket allows the ornamental accessory 158 to be slipped into the accessory sleeve 102. The accessory seal 160 can then be pressed by the consumer 302 sealing firmly in a zip-lock type fashion or sealed by other suitable fastener types or kinds as may be required and/or desire in a particular embodiment. Once sealed the ornamental accessory 158 is in a water-resistant environment.

Figure 5:
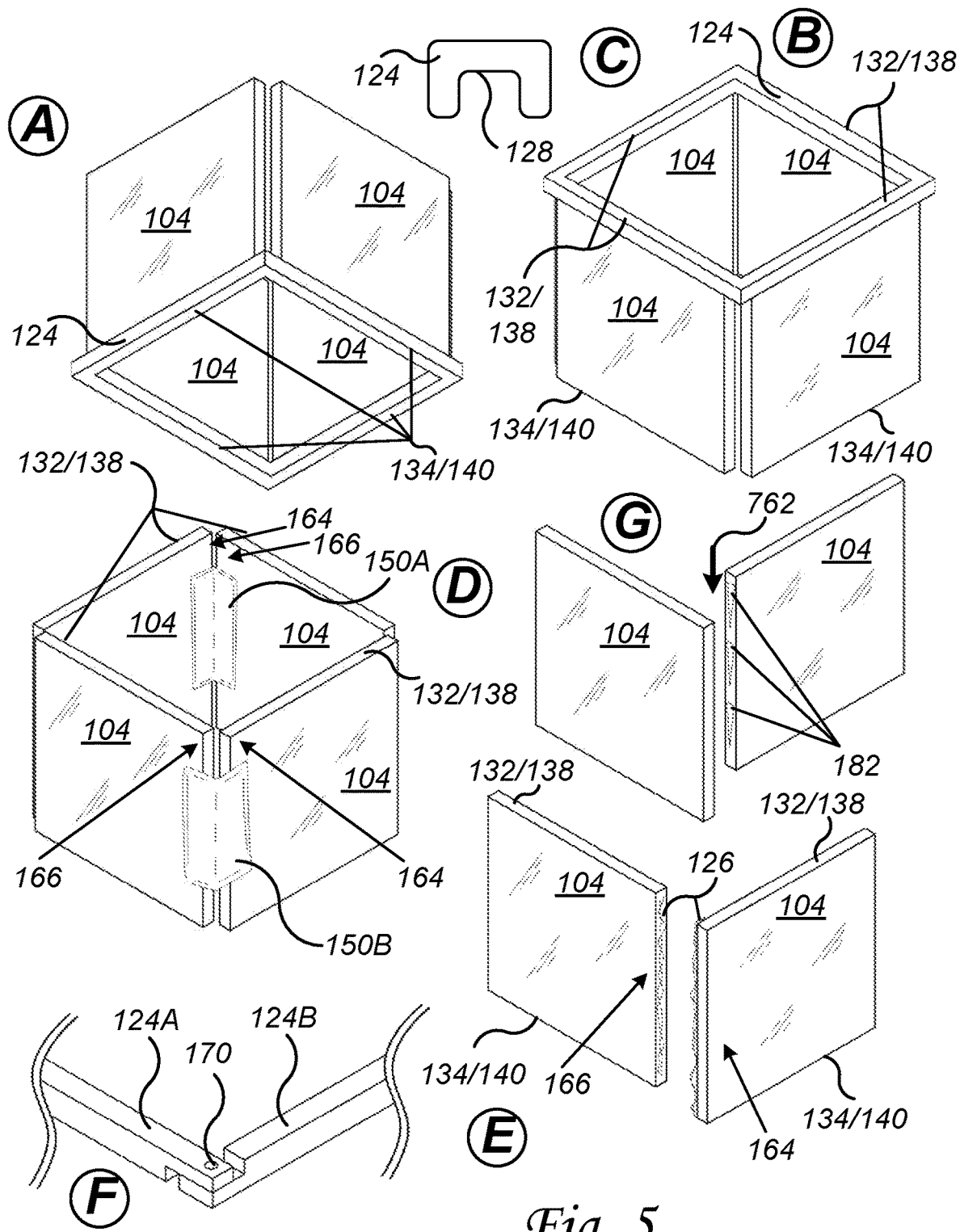
FIG. 5 illustrates one example of a panel connector.

Referring to FIG. 5, there are illustrated examples of a panel connector 124, 126, 150, and 182. In an exemplary embodiment, panel connectors 124, 126, 150, and 182 align and interconnect the translucent panel 104 forming a perimeter 132 having a top edge 138, a bottom edge 140, a bottom perimeter 134, and an interior region 136. In references 'A' and the panel connector 124 is a ridged frame that fastens along the bottom edge 140 illustrated in reference 'A' or the top edge 138 illustrated in reference 'B' holding each of the translucent panels 104 in position.

The ridged frame 124 can have a u-shaped groove 128 configured for receiving the top edge 138 or the bottom edge 140 of each of the translucent panels 104. The u-shaped groove 128 of the ridged frame 124 illustrated in reference 'C' can press over the edges of the translucent panels 104 gripping the edges of the translucent panels 104 and aligning and holding the translucent panels 104 firmly. The ridged frame 124 can be made of plastic, metal, or other materials as may be required and/or desired in a particular embodiment.

As better illustrated in at least FIG. 7A, in a plurality of exemplary embodiments, the ridged frame 124 can be formed into a variety of shapes including triangle, square, pentagon, and other shapes that hold the translucent panel 104 creating different shaped ambiance lighting systems.

In another exemplary embodiment, in FIG. 5 reference 'D', the panel connector 124 can be an adhesive film 150A-B. In this regard, each of the translucent panel 104 has a left edge 164 and a right edge 166. The adhesive film 150A-B spans adjacent right edge 166 and left edge 164 of each of the translucent panel 104. In operation, the adhesive film 150A can be placed on the interior surface, or interchangeably the adhesive file 150B can be placed on the exterior surface of the translucent panels 104.

An advantage, in the present invention, of using adhesive film 150A-B to secure the translucent panel is that the adhesive film 150A-B is positioned and secured to the translucent panel 104 adjacent edges to allow each of the translucent panels 104 to change angles for use and well as stack for storage.

In an exemplary embodiment, in reference 'E', the panel connector 124 can be hook-and-loop 126. In this regard, the hoop-and-loop can be disposed of on opposite adjacent edges or side 126 of the translucent panels 104. In operation, the consumer 302 can press the hook-and-loop edges of adjacent translucent panels 104 together to create the perimeter. The sleeve 110 can then be applied to the top edge 138 or bottom edge 140 to hold the shape of the ambiance lighting system 100. Such hook-and-loop can be VELCRO or other similar types or kinds of hook-and-loop-material as may be required and/or desired in a particular embodiment.

In an exemplary embodiment, in reference 'F', the panel connector 124A-B is a rigid frame having a plurality of hinges 170 located at the corner junctions where each of the translucent panels 104 intersect. In this regard, the hinges 170 are configured to allow each of the translucent panels 104 to change angles with respect to each other for use expanding into the desired shape as well as for stacking the translucent panels 104 for storage with the panel connector attached. Such a hinge 170 can be a press-fit pin, rivet, or other hinge type or kind that passes through and connects, in a movable manner, the movable corners of the panel connector 124A-B. Hinges can be placed at each corner of the panel connector 124. The hinge pin 170 illustrated is an example and not a limitation, other suitable types and kinds of hinges can be used as may be required and/or desired in a particular embodiment.

In an exemplary embodiment, the panel connector 182 is one or more interlocking embossed and deembossed guides on opposing translucent panels 104 that securely interconnect together. In operation, when two translucent panels 104 are aligned, the embossed and deembossed guides engaged, and the two translucent panels 104 slid 762 in opposing directions causing a friction fitting between the embossed and deembossed guides. In an exemplary embodiment, the number of and shape of the embossed and deembossed guides can be customized as may be required and/or desired in a particular embodiment.

Figure 6:
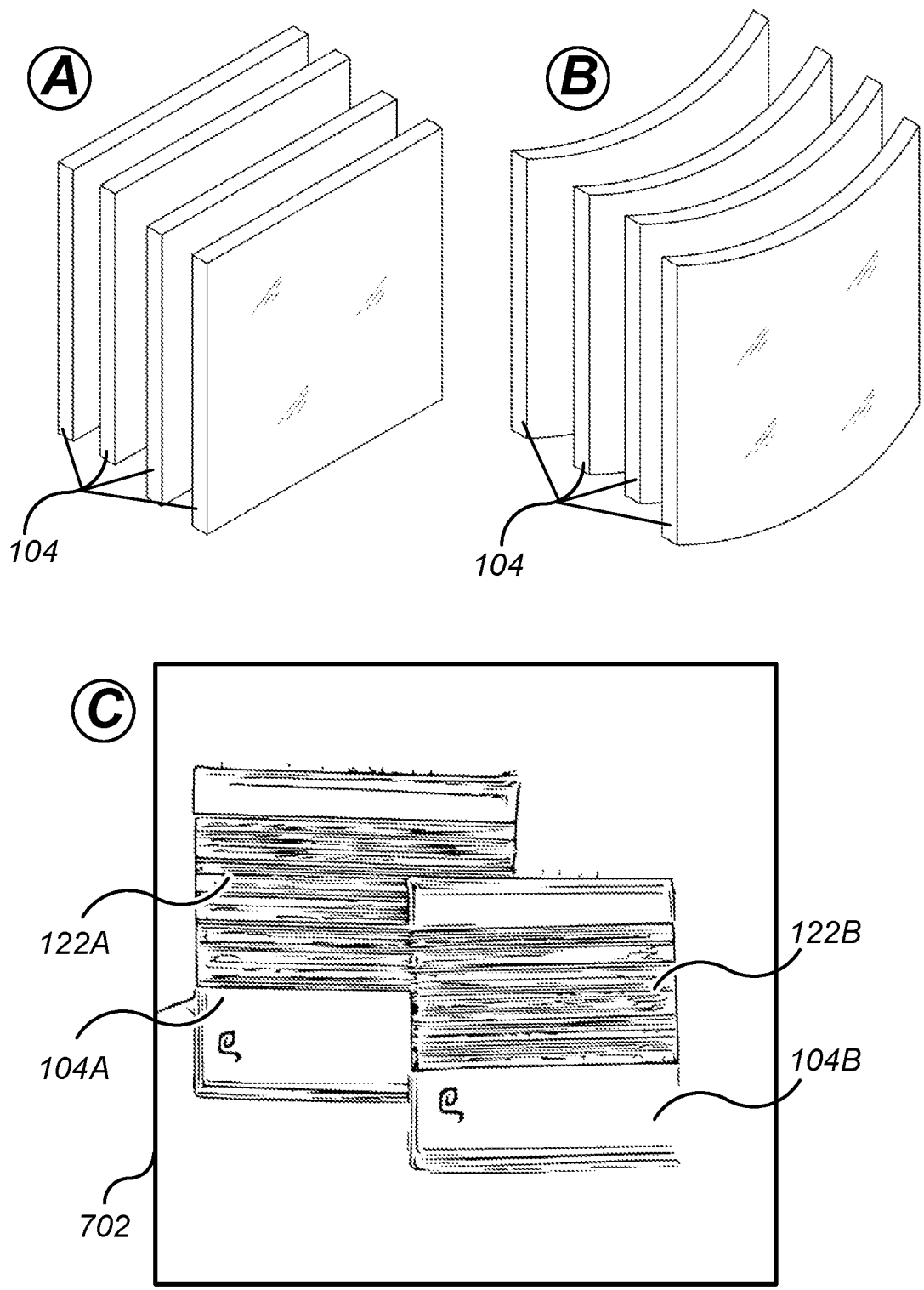
FIG. 6 illustrates examples of translucent panels.

Referring to FIG. 6, there are illustrated examples of translucent panels 104. In a plurality of exemplary embodiments, the translucent panels 104 can be cut or shaped to any size, and any number of translucent panels 104 can be used in an ambiance lighting system 100. For example and not a limitation, preferred translucent panel 104 sizes are four-inches by four-inches, six-inches by six-inches, or other sizes as may be required and/or desired in a particular embodiment. Shown in reference 'A' are planar translucent panels 104 which interconnect to form perimeter 132 and bottom perimeter 134. Shapes such as triangles, squares, and other shapes can be formed using multiple translucent panels 104.

The translucent panels 104, in reference can also be curvilinear in shape to form contoured, round, and other shapes. Planar and curvilinear translucent panels 104 of the same size or different sizes can be mixed and matched to create the ambiance lighting system 100 as may be required and/or desired in a particular embodiment.

In an exemplary embodiment, in reference 'C', photo 702 illustrates how different size translucent panels 104 can be stacked and wrapped with bands 122A-B for shipping to a consumer 302, displayed for purchase in a store, stacked and stored ready for future use, or packaged for other purposes as may be required and/or desired in a particular embodiment.

Referring to FIGS. 7A-7B, there are illustrated examples of a plurality of ambiance lighting systems being interconnected forming ambiance lighting cluster effects. In FIG. 7A, in an exemplary embodiment, a plurality of ambiance lighting systems 100 can be stacked and/or coupled together forming an ambiance lighting cluster 734 of ambiance lighting systems 100. Reference 'A' illustrates one example of a row of three ambiance lighting systems 100 interconnected forming a one-by-three matrix ambiance lighting cluster 734 effects.

FIG. 7A, reference 'B' illustrates ambiance lighting cluster 734 effects using triangle-shaped ambiance lighting systems 100. In this regard, the triangle-shaped ambiance lighting systems 100 can be coupled together in pairs, or in reference 'C' coupled together and arranged in curved shapes, or in reference 'D' coupled together and used to create straight rows and curved corners.

In FIG. 7B, reference 'A', panel fasteners 168 can secure each of the ambiance lighting systems 100 together. In this regard, the panel fasteners can interconnect a plurality of ambiance lighting systems 100 as desired to create an ambiance lighting cluster 734 effects.

Such panel fasteners 168 can be magnets, hook-and-loop, adhesive tapes or films, or other types and kinds of panel fasteners as may be required and/or desired in a particular embodiment. The panel fasteners 168 can be surface applied to translucent panel 104, recessed in de-embossed cavities, or press-fit into holes.

Reference 'B', photo 710, illustrates one example of a matrix of nine ambiance lighting systems 100 interconnected forming a three-by-three matrix ambiance lighting cluster 734 effects. In an exemplary embodiment, in FIG. 7A reference 'A', a plurality of ambiance lighting systems 100 can be stacked and/or coupled together in rows and columns to form a lighted matrix of ambiance lighting systems forming an ambiance lighting cluster 734.

Figure 8:
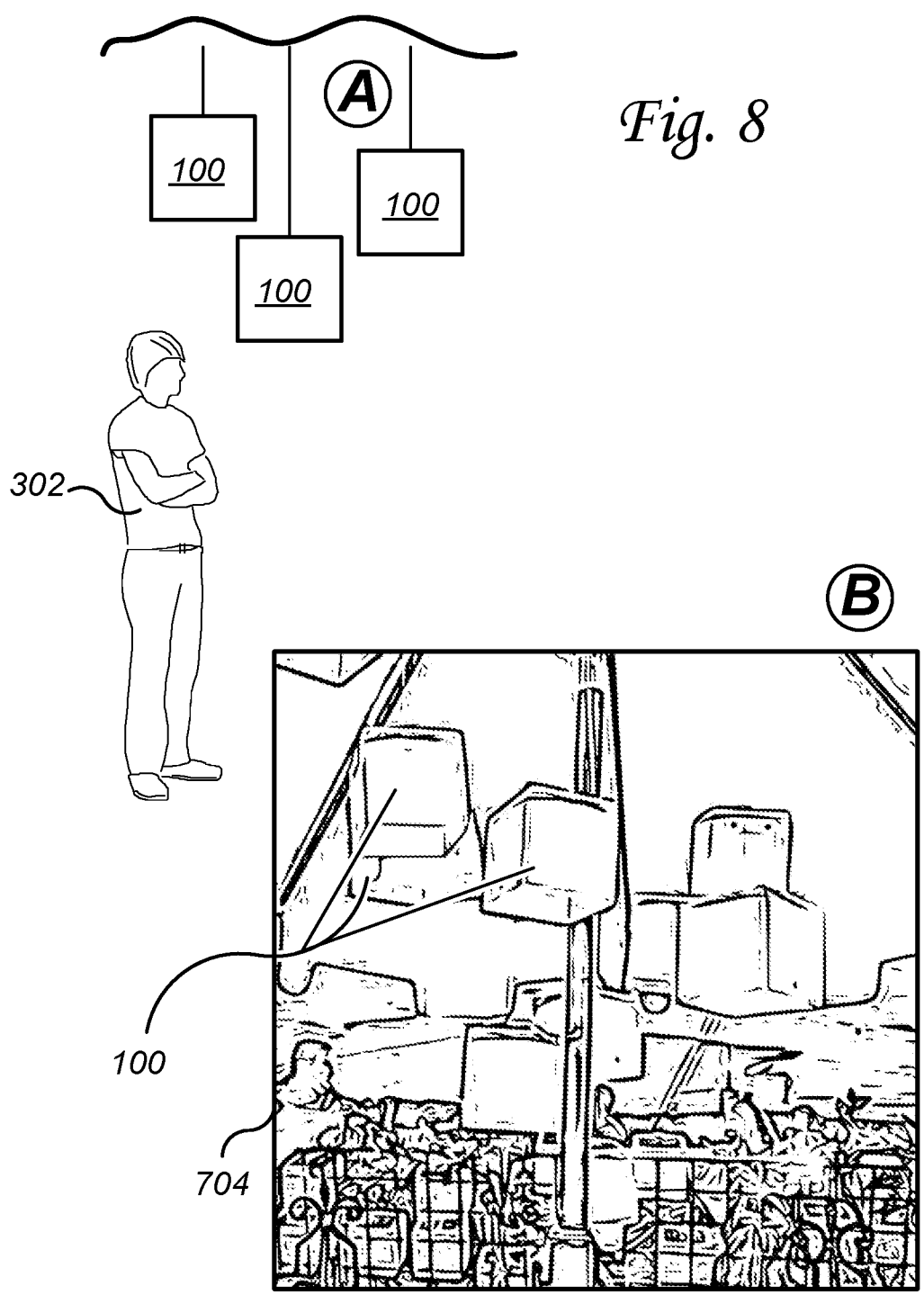
FIGS. 8-10 illustrate examples of applications of an ambiance lighting system.
Figure 9:
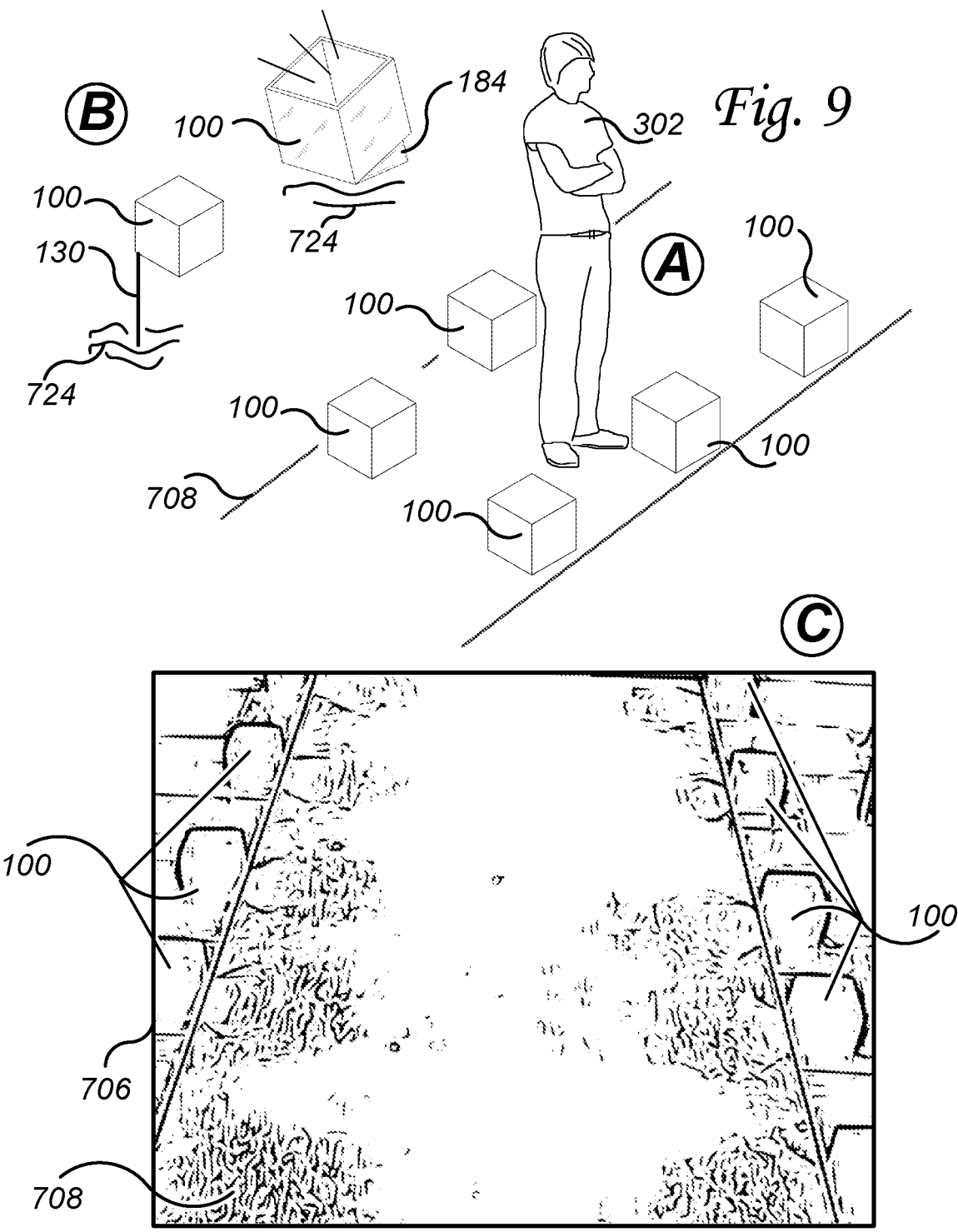
Figure 10:
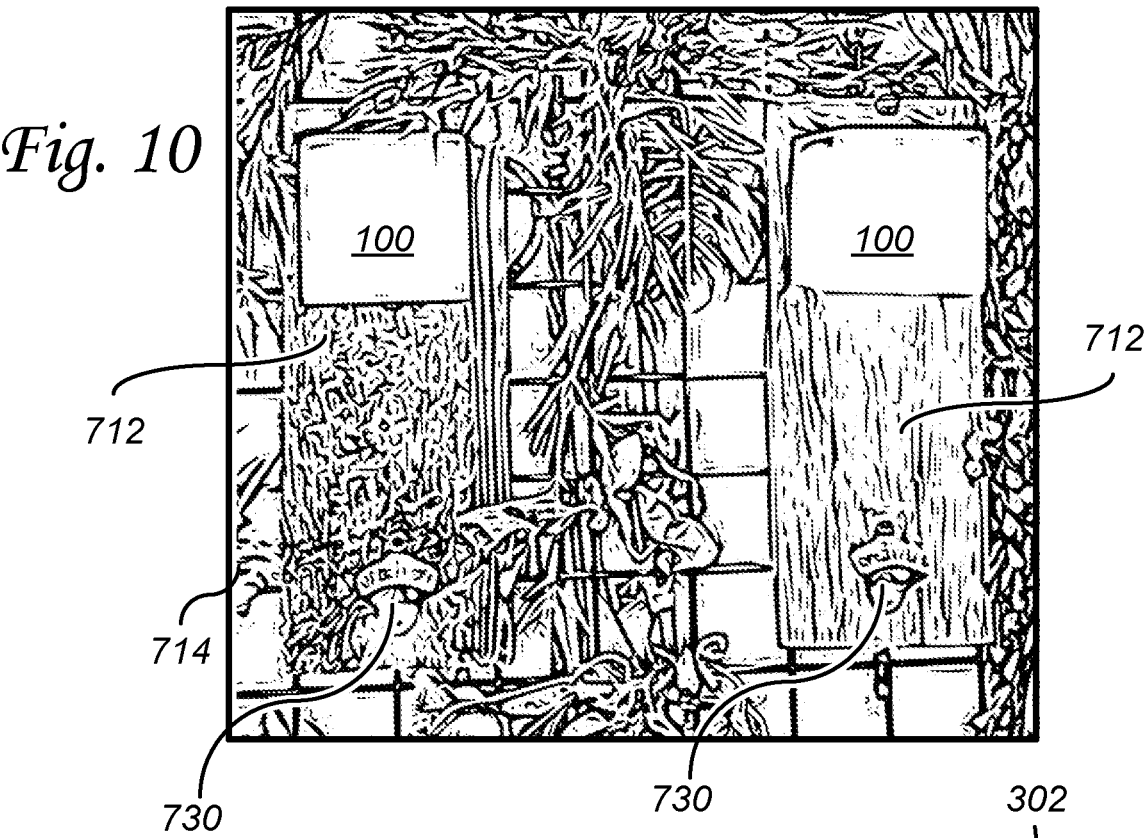

Referring to FIGS. 8-10, there are illustrated examples of applications of an ambiance lighting system 100. In an exemplary embodiment for example and not a limitation, in FIG. 8, reference 'A' illustrates a plurality of ambiance lighting systems 100 can be hung on short strings tied to the handle 108 or other places and secured to a roof, patio fixtures, umbrella, sun deck, or some other suitable overhang. In reference B', photo 704, illustrates a plurality of ambiance lighting systems 100 hanging from patio umbrellas and placed in a garden setting to provide ambiance lighting for an outdoor event place.

Referring to FIG. 9, in an exemplary embodiment for example, and not a limitation, in reference 'A', a plurality of ambiance lighting systems 100 can be positioned to illuminate a pathway 708, or other similar types or kinds of walkways or roadways. In reference 'B', optionally a rod 130 can be added to the ambiance lighting system 100 to elevate the system above the ground 724. In another exemplary embodiment, a light diverter 184 can be adhered to the outer surface of one of the translucent panels 104 or on the top panel to invert the ambiance lighting system 100 and hold it at an angle pointed upward while it is sitting on the ground 724 to better illuminate objects above the ambiance lighting system 100. In reference 'C', photo 706 illustrates a pathway 708 illuminated by a plurality of ambiance lighting systems 100.

Referring to FIG. 10, in an exemplary embodiment, an ambiance lighting system 100 can be incorporated into art 712. Art 712 can be for example and not a limitation accent art, wall art, functional art, and other display and/or decorations. Photo 714 illustrates an ambiance lighting system 100 incorporated on a wood plank art 712 with an old-style bottle opener 730.

Figure 11:
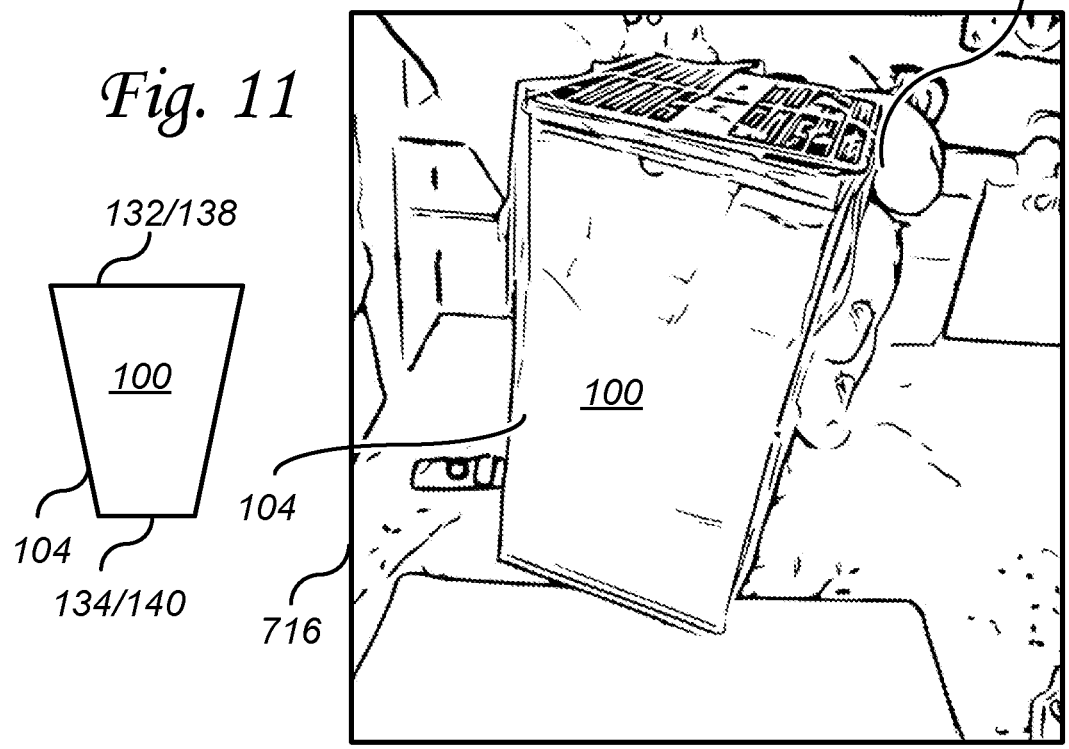
FIG. 11 illustrates one example of a top perimeter edge and a bottom perimeter edge of different sizes.

Referring to FIG. 11, there is illustrated one example of a top perimeter 132 edge and bottom perimeter edge 134 of different sizes. In an exemplary embodiment, the perimeter of an ambiance lighting system 100 can have a top perimeter edge 132 formed by the top edge 138 of each of the translucent panel 104 and a bottom perimeter edge 134 formed by the bottom edge 140 of each of the translucent panels 104. The top perimeter edge 132 can be greater in length than the bottom perimeter edge 140. In this regard, the translucent panels 104 can have different kinds of shapes such as trapezoid, and other kinds of shapes resultant from the top perimeter 132 and the bottom perimeter 134 being unequal lengths creating a tapered effect when the translucent panels 104 are assembled. Photo 716 illustrates one example of the top perimeter edge 132 being greater than the bottom perimeter edge 140.

Figure 12:
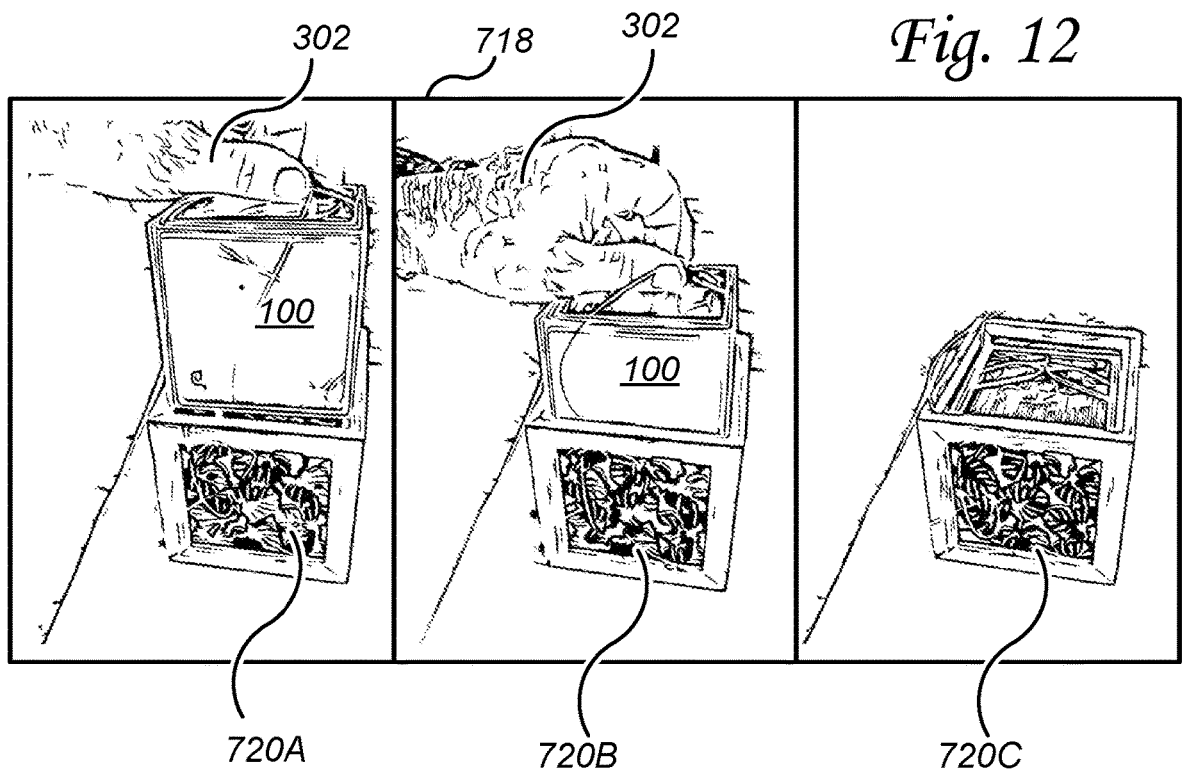
Figure 13:
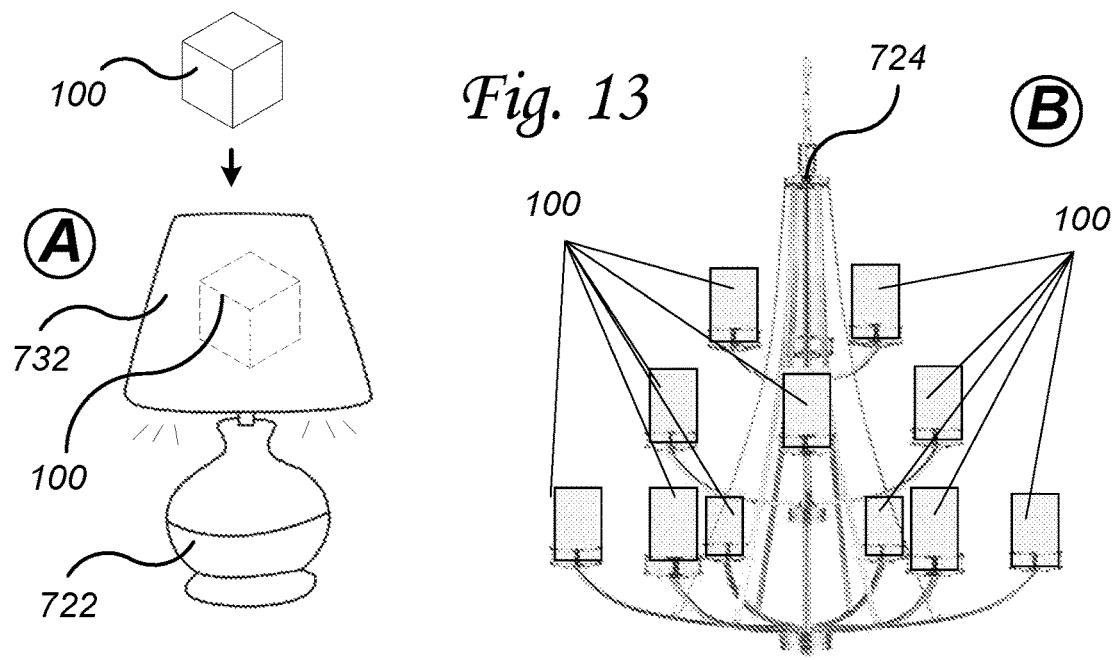

Referring to FIGS. 12-14, there are illustrated examples of ambiance lighting systems 100 being inserted into secondary lighting fixtures a box 720A-C, a lamp 722 having a lampshade 732, and a chandelier 724. The secondary lighting fixture can be a lamp 722, a box 720A-C, a chandelier 724, a lampshade 732, or other types or kinds of secondary light fixtures as may be required and/or desired in a particular embodiment. In another exemplary embodiment, a sleeve 110 with lighting control panel 106 having a solar panel as part of the power source 602 can be utilized in place of an entire ambiance lighting system 100.

In an exemplary embodiment for example and not a limitation, FIG. 12 photo 718 illustrates at least one of the ambiance lighting system 100 can be inserted into a secondary lighting fixture, the photo 718 shows the insertion progression reference as the box 720A-C, by a consumer 302. The secondary lighting fixture box 720A-C is a box shape or other shape with cutout side panels such that the ambiance lighting system 100 is inserted into the top of the box 720A-C causes the cutout panels on the box 720A-C to be backlit creating the desired lighting effect.

In an exemplary embodiment, one or more of an ornamental accessory 158 can hang from the top edge 138 positioned adjacent to the surface of one or more of the translucent panel 104. In this regard, instead of an ornamental accessory 158 sliding into an accessory sleeve 102, the ornamental accessory can hang such as by a hook or string from the top edge 138 resting against the translucent panel such that the ornamental accessory 158 is backlit by the ambiance lighting system 100.

Referring to FIG. 13, in an exemplary embodiment, reference 'A' illustrates the ambiance lighting system being integrated into a lamp 722 having a lampshade 732. In a plurality of exemplary embodiment, the ambiance lighting system 100 can be integrated into a lamp 722 where the ambiance lighting system is integrated into a lampshade 732, or integrated into other fixtures as may be required and/or desired in a particular embodiment.

In another exemplary embodiment, in reference 'B' a plurality of ambiance lighting systems 100 can be integrated into a chandelier 724.

Referring to FIG. 14, in an exemplary embodiment for example, and not a limitation, reference 'A' illustrates how a light control panel 106 can be placed into a translucent basket 112. In the alternative, a complete ambiance lighting system 100 can be placed into basket 112. For disclosure purposes, the basket can be a vase, bucket, or other types and kinds of containers as may be required and/or desired in a particular embodiment.

Once the light control panel 106 or the complete ambiance lighting system 100 is placed into the translucent basket 112 the basket 112 by way of the translucent sides will provide the desired lighting effect. The basket 112 can be made from one or more of the following materials: polycarbonate, plastic, Plexiglass, Lexan, Acrylic, acrylonitrile butadiene styrene (ABS), glass, fabric, recycled materials, or other suitable materials as may be required and/or desired in a particular embodiment. In the exemplary embodiment where the translucent material 104 is flexible, such as a fabric, the basket 112 in reference 'B' can be compressed 726 to adjust the height and/or for storage.

In reference 'C', photo 728 illustrates how a consumer 302 can place inside a basket 112 either a light control panel 106 or a complete ambiance lighting system 100 to create the desired lighting effect.

Referring to FIG. 15A, there are illustrated examples of applications of an ambiance lighting system 100. In an exemplary embodiment, for example, and not a limitation, ambiance lighting system 100 can be integrated into, onto to, or under furniture to create ambiance lighting effects. In this regard, in reference 'A' an ambiance lighting system 100 can be integrated under a chair 734, or a table 736, or in reference 'B' under a bench 738, or in reference 'C' under a cabinet 740 such as in a kitchen or other places. In a plurality of embodiments, a plurality of ambiance lighting system 100 can be integrated under all types and kinds of furniture as may be required and/or desired in a particular embodiment. In another embodiment, in place of a complete ambience lighting system 100, a plexiglass panel can be a translucent panel 104, or other translucent material, and comprise a sleeve that holds a lighting control panel 106 having a solar panel as part of the power source 602.

In an exemplary embodiment, in an application where the ambiance lighting system 100 is mounted on the underside of, for example, and not a limitation, a bench 738, table 736, or other types or kinds of furniture, a hole can be cut into the furniture above the ambiance lighting system 100 to allow sunlight to reach the solar panel power source 602 to recharge the ambiance lighting system 100.

In another exemplary embodiment, the ambiance lighting system 100 can be positioned under cabinets, shelves, and other structures and positioned above plant 746. In this regard, the ambiance lighting system 100 can be a grow light for plants.

In reference 'D', an ambiance lighting system 100 can be equipped with a device charger 638 which is interconnected with a power source 602. One or more of the device charger 638 can be implemented in an ambiance lighting system 100 having similar or different functionality. In an exemplary embodiment, the device charger 638 can be configured to recharge consumer 302 computing devices 506 and other similar devices. In this regard, the computing device 506 can be plugged into the device charger 638 by way of a power cord 644 which can be a USB cord or other suitable type and or kind of power cord 644 as may be required and/or desired in a particular embodiment.

In another exemplary embodiment, an external power source 646 such as a transformer, an AC voltage source, a DC voltage source, or other suitable power sources can be plugged into the device charger 638 by way of a power cord 648, wherein the external power source 646 can charge the ambiance lighting system 100 power source 602 as may be required and/or desired in a particular embodiment.

Referring to FIG. 15B, there are illustrated examples of applications of an ambiance lighting system 100. In an exemplary embodiment, in reference 'A', an ornament 742 can be hung from the inside of the ambiance lighting system and the shadow outline 744 of the ornament 742 can be cast onto the surfaces of the translucent panels 104.

In an exemplary embodiment, in reference 'B', a recharging station 760 can be configured with an external power source 646 to charge a plurality of the lighting control panel 106 at the same time. In this regard, a plurality of the lighting control panel 106 can be plugged into a charging station and recharged by the external power 646. In operation, if an ambiance lighting system 100 is not in a location that provides light for solar panels or provides other suitable power the lighting control panel 106 will periodically need to be recharged. As such, sleeve 110 housing the lighting control panel 106 can be replaced with a fully charged lighting control panel 106, and the depleted lighting control panel 106 can be plugged into recharging station 760 and recharged.

In an exemplary embodiment, the light control panel 106 can be removed from sleeve 110 and placed in a recharging station terminal where other light control panels 106 are co-located. A recharged light control panel 106 can then be removed from the recharging station terminal and placed in the sleeve 110, thereby, rotating freshly charged light control panels 106 that were in need of recharging. As may be required and/or desired in a particular embodiment, the recharging station terminal can be fashioned into a decorative piece to blend in with the décor.

Figure 15C:
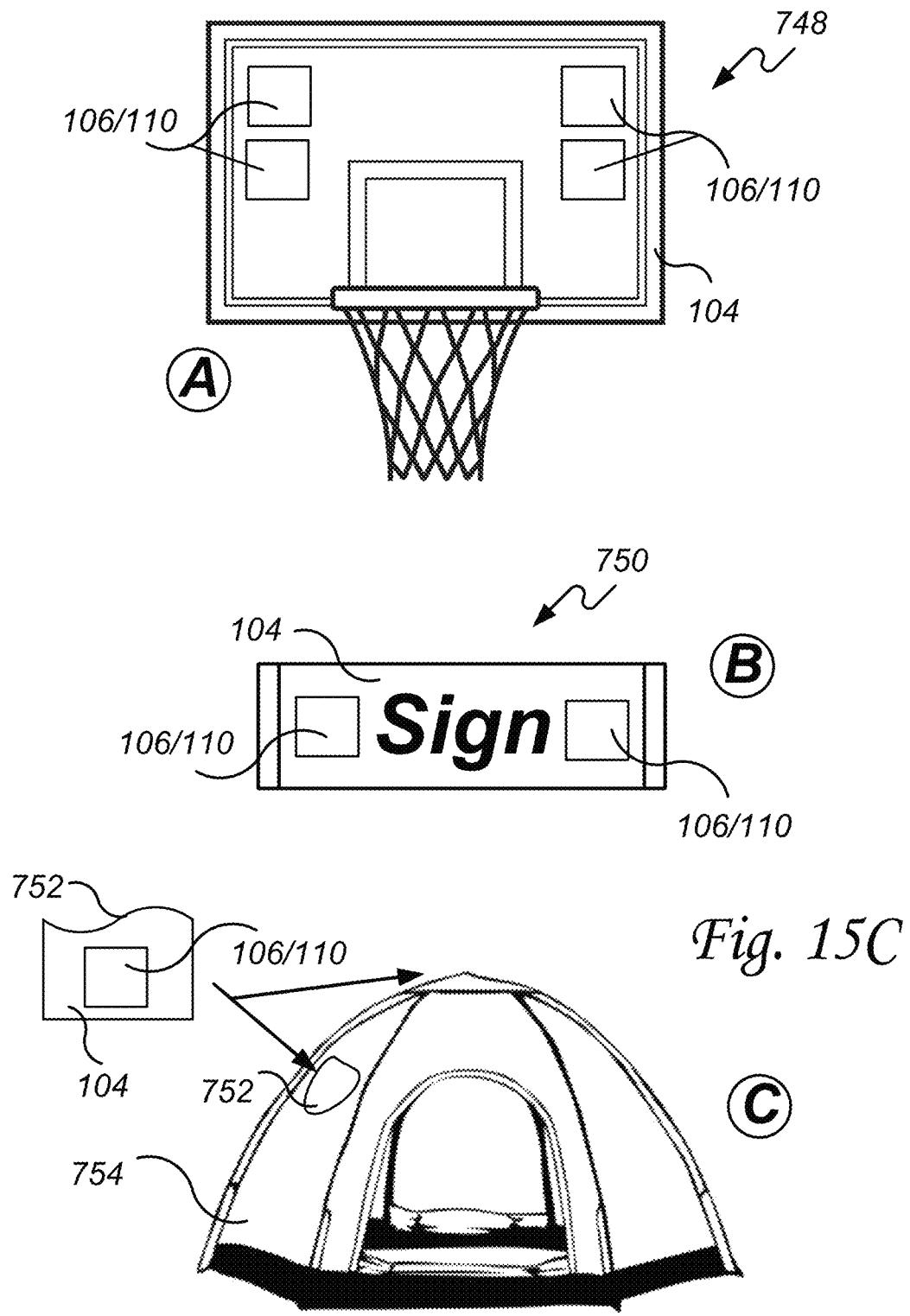

Referring to FIG. 15C, there are illustrated examples of an application of an ambiance lighting system 100. In reference 'A', a basketball backboard 748 can comprise a translucent panel 104 configured to be a backboard. In such as application, the translucent panel 104 can be clear or clouded in appearance as may be required and/or desire in a particular embodiment. In operation, one or more of the sleeves 110 with the light control panel 106 can be secured to and behind the backboard translucent panel 104 so that consumers 302 can play basketball at night and in other low light conditions. In an exemplary embodiment, signs of all types can utilize the light control panels 106 in a plexiglass, or other translucent material. As an example, and not a limitation, such signs can include freestanding, wall mounted, signs attached to buildings, as well as other types and kinds of signs as may be required and/or desired in a particular embodiment.

In another exemplary embodiment, in reference 'B' the translucent panel 104 can be a sign 750. In such an application, one or more of the sleeve 110 with the light control panel 106 can be secured to and behind the translucent panel 104 as to provide a lighted sign that consumers 302 and others can see.

In another exemplary embodiment, in reference 'C', the translucent panel 104 can be a window 752 on a tent 754. In this regard, one or more of the sleeve 110 with the light control panel 106 can be secured to the window inside or outside tent 754. In this regard, sunlight can recharge the power source 602 such as by solar panels during daylight, and provide a light source to illuminate the interior of the tent in the evening or other low light conditions. Windows 752 can be located on any surface of tent 754 including the sides and top of tent 754 as may be required and/or desired in a particular embodiment.

Figure 15D:
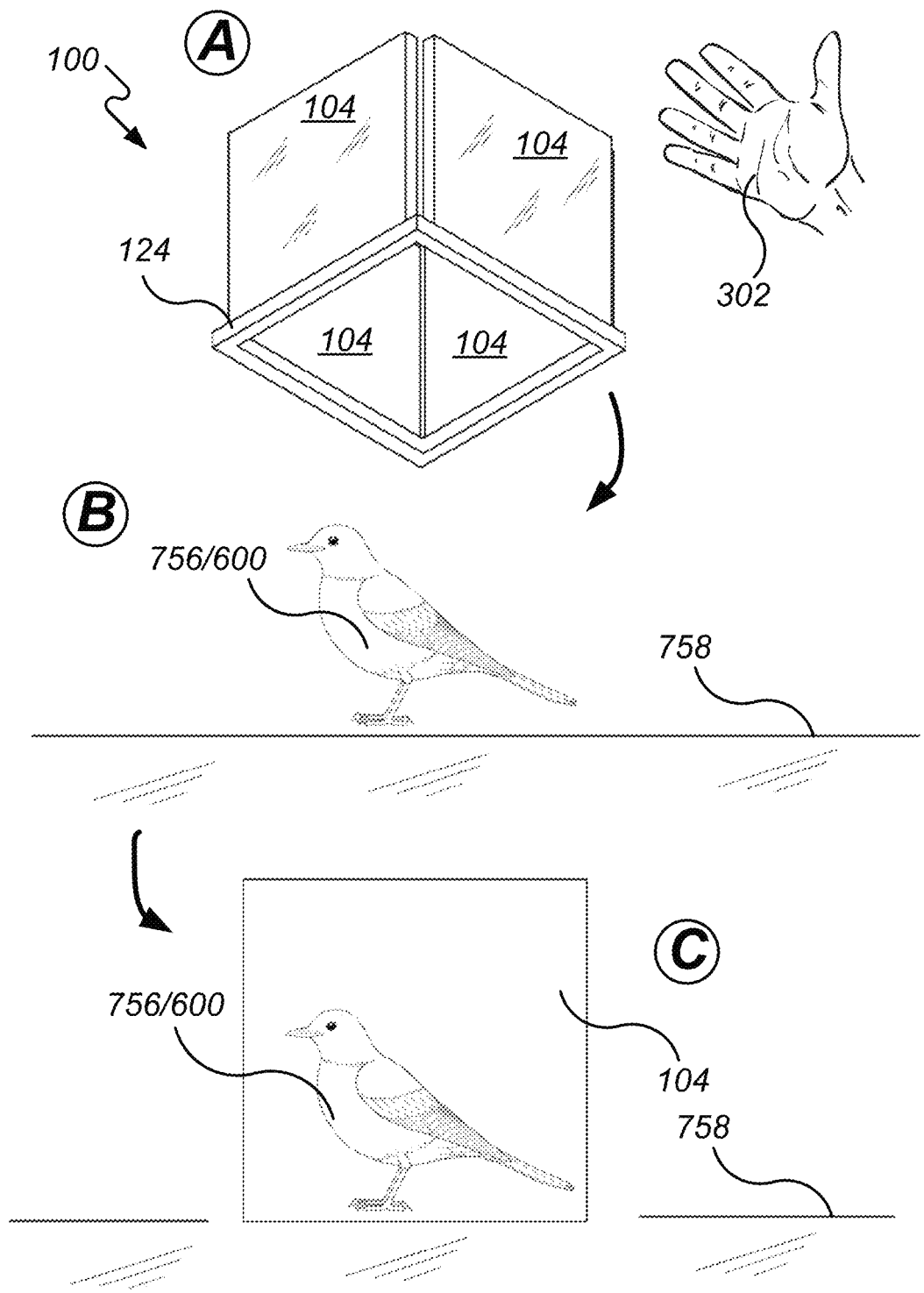

Referring to FIG. 15D, there are illustrated examples of an application of an ambiance lighting system 100. In an exemplary embodiment, the translucent panels 104 can form a cover that a consumer 302 can place over an object such as a bird 756 or another object sitting on a surface 758. In this regard, consumer 302, in reference 'A', can removably cover an object 756, in reference 'B', and the control system 600 including the power source 602, and the LED(s) 608. In reference 'C', the combination forms an ambiance lighting system 100. Object 756 can be a bird, or other types and kinds of objects as may be required and or desired in a particular embodiment. In an exemplary embodiment, the object can be a night light and make use of colorful LED(s) to provide light as well as promote by LED color selection calming, relaxing, soothing, and/or other health and wellness benefits as may be required and/or desired in a particular embodiment.

Referring to FIG. 16, there are illustrated examples of mirrored translucent panels. In an exemplary embodiment, mirrored panels 176 or mirrored films 174 can be used to direct the light from the lighting panel 106 in different ways to create ambiance lighting effects. Such ambiance lighting effects can include for example directing light away from one or more of the translucent panels 104 to darken certain panels, directing light towards one or more of the translucent panels 104 to brighten certain panels, directing light downwards to brighten the surface or décor below the ambiance lighting system 100, directing the light away from the sleeve 106 of the ambiance lighting system 100, or directing the light with mirrored panels 176 or mirrored films 174 in other ways to create other ambiance lighting effects as may be required and/or desired in a particular embodiment.

In an exemplary embodiment, mirrored panels 176 or mirrored films 174 can be added to one or more of the translucent panels 104 or bottom translucent panel 152. The mirrored panels can be fully reflective, semi-reflective, operate as a two-way mirror or be mirrored in other ways and configurations as may be required and or desired in a particular embodiment. In this regard, in reference 'A', a mirrored panel 176 can be adhered by adhesive, hook-and-loop, magnets, or other methods to anyone of the translucent panels 104 or the bottom translucent panel 152. Alternatively, the translucent panel 104 and/or the bottom translucent panel 152 can be a mirrored panel 172 and as such not necessitate the addition of a secondary mirrored panel 172 being added and attached to the translucent panel 104 or bottom translucent panel 152.

In another exemplary embodiment, in reference 'B', a mirrored film 174 can be applied to the translucent panel 104 or the bottom translucent panel 152. Such mirrored film can be adhered by adhesive, hook-and-loop, magnets, or other methods to the surface of the panel providing the desired mirrored effect and result.

In another exemplary embodiment, in reference 'C', a mirror shaper 180 can be used to contour the mirrored film 174 on one or more of the translucent panel 104 or bottom panel 152. In this regard, the mirror shaper 180 can be adhered by adhesive, hook-and-loop, magnets, or other methods to the surface of one or more of the translucent panels 104 or bottom translucent panel 152 and covered with a mirrored film 174. The mirror shaper 180 provides a three-dimensional surface structure on an otherwise planer translucent panel 104 or bottom panel 152. The mirrored shaper when covered with a mirrored film 174 enables the design of intricate ambiance lighting effects by allowing radiated light from the lighting control panel 106 to be tailored internally within the ambiance lighting system 100 and directed externally into spaces, onto surfaces, and onto decor.

The mirror shaper 180 can be fabricated to cover some, part, or all of a translucent panel 104 or a bottom panel 152. In addition, the mirror shaper 180 can be fabricated to span one or more translucent panels 104 and/or the bottom panel 152. Any number of mirror shapers 180 covered in the mirrored film 174 can be used in an ambiance lighting system 100. Additionally, the mirrored shaper 180 can be fabricated with windows 178 so that in applications where partial light reflection is desired a portion of the light can pass through the mirrored film 174 and the mirror shaper 180 and exit the translucent panel 104 or bottom translucent panel 152.

The mirror shaper 180 can be any shape or size and fabricate from a plastic, a wireframe, or other materials as may be required and or desired in a particular embodiment to allow for maximum design and ambiance lighting effect options.

Such mirrored film 170 can be manufactured by 3M or other companies as may be required and/or desired in a particular embodiment.

Figure 17:
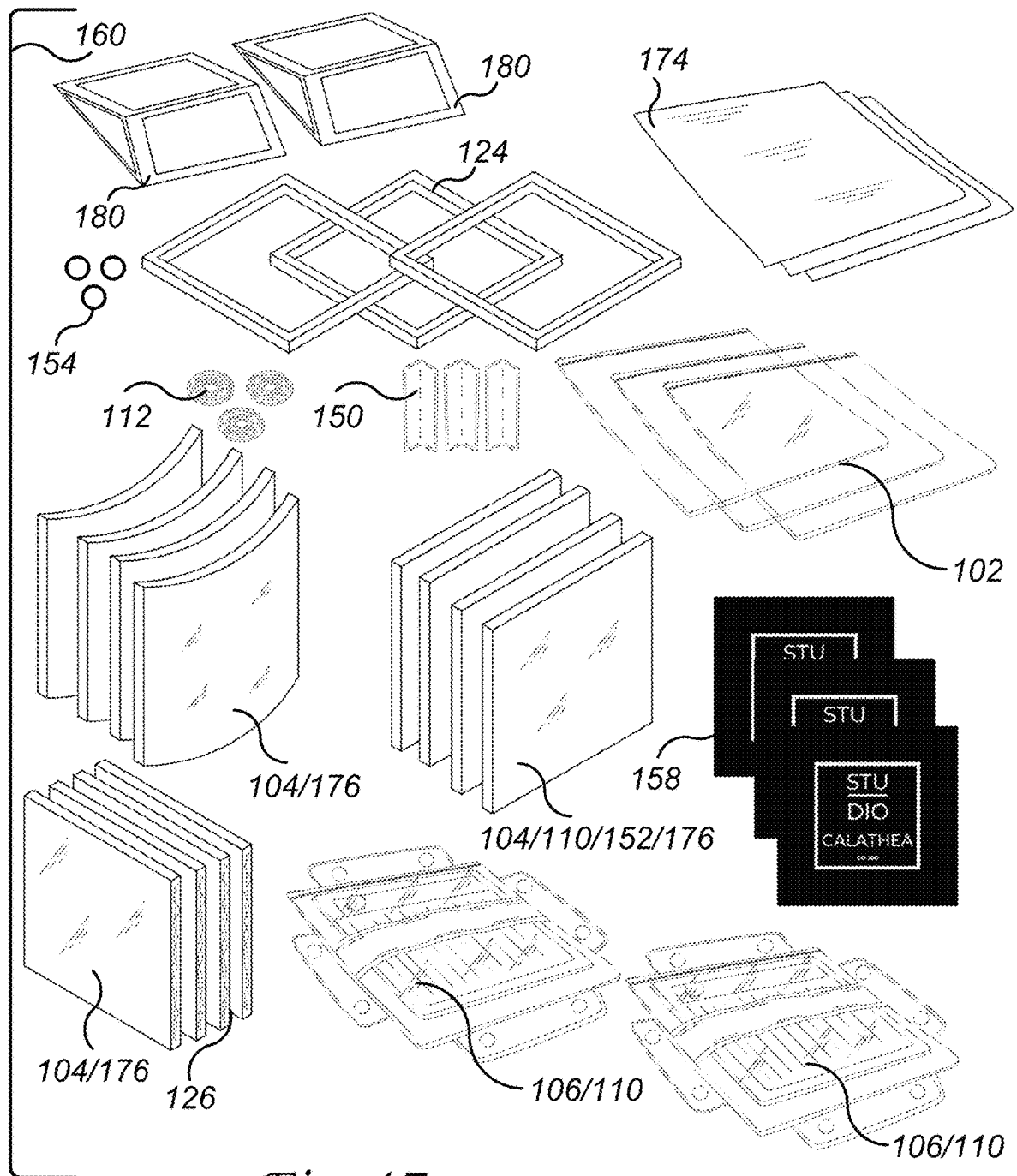
FIG. 17 illustrates one example of an ambiance lighting system kit.

Referring to FIG. 17, there is illustrated one example of an ambiance lighting system kit 160. In an exemplary embodiment, an ambiance lighting system kit can comprise a plurality of each item necessary for a consumer 302 to assemble one or more of the ambiance lighting systems. In this regard, supplies to build 1, 2, 5, 10, 20, or other quantities of the ambiance light system 100 can be packaged in kit 160 form so a consumer 302 can assemble as many as they need. Additionally, customizable options or items such as remote-control 636, and other customizable options or items can be included in kit 160. In an exemplary embodiment, ambiance lighting system kit 160 can come in a variety of translucent panels sizes 104 and thus ambience lighting systems sizes including four-inch by four-inch, six-inch by six-inch, two-inch by four-inch, and other sizes as may be required and/or desired in a particular embodiment.

In an exemplary embodiment for example and not a limitation, illustrated in the ambiance lighting system kit 160 are one or more panel connector 124, one or more adhesive film 150, one or more Fresnel lens 112, one ore more translucent panel 104, one or more curvilinear translucent panel 104, one or more panel connector 126 such as hook-and-loop or other panel fastener applied to the translucent panel 104, one or more panel fastener 154, one or more of a lighting control panel 106, one or more of a sleeve 110, one or more of an accessory sleeve 102, one or more of mirror shaper 180, one or more of a mirrored film 174, and one or more of an ornamental accessory 158. Additionally, one or more of the translucent panel 104 or the bottom translucent panel 152 can be mirrored.

In an exemplary embodiment, an ambiance lighting system kit 160 can comprise more than one of a translucent panel 104, one or more of an accessory sleeve 102 secures to the surface of one or more of the translucent panel 104. One or more of a panel connector 124 aligns and interconnects the translucent panel 104 forming a perimeter having a top edge 138, a bottom edge 140, and an interior region 136. One or more of a light control panel 106 comprising one or more light-emitting diode (LED) 608, and a power source 602. One or more of a sleeve 110 has an open edge 148. The light control panel 106 slides into the open edge 148 and is retained in sleeve 110. The sleeve 110 is secured across the top edge 138 or the bottom edge 140. The light control panel 106 is orientated within the sleeve 110 so that the LED(s) 608 illuminate the interior region 136 projecting light through the translucent panel 104 creating an ambiance lighting effect.

In another exemplary embodiment, at least one of the following is included in the ambiance lighting system kit 160 one or more of a fresnel lens 112, one or more of a bottom translucent panel 152 is attached across the bottom edge 140, and one or more of the fresnel lens 112 is secured to the bottom translucent panel 152. The panel fastener can be one or more of an adhesive strip 150 that spans edges of the translucent panel, one or more of a magnet 154, or one or more of a hook-and-loop 126. One or more of the translucent panels 104 can be curvilinear in shape. One or more of an ornamental accessory 158 having a plurality of apertures therethrough slides into one or more of the accessory sleeve 102.

In addition, at least one of the following can be included in the ambiance lighting system kit the panel fastener is a rigid frame 124 having a u-shaped groove configured for receiving the top edge 138 or the bottom edge 138 hold each of the translucent panel 104 in position. The panel fastener rigid frame 124 further comprises a plurality of hinges 170 located at junctions where each of the translucent panels 104 intersect. One or more of a flap 118 is formed along at least some of the edges of the sleeve 110. The flap 118 extends beyond perimeter 132. A fastener 114 is affixed to the flap 118. The fastener 114 interconnects with the panel fastener 116 securing the sleeve 110 to the top edge 138 or bottom edge 140 of each of the translucent panel 104. One or more of the translucent panels 104 can have one or more fastener de-embossed recess/holes 172. The panel fastener 154 can be fitted into the fastener hole 172. A seal 120 proximate the open edge 148 of the sleeve 110 that when closed by a consumer 302 creates a water resistance environment around the light control panel 106. A handle 108 spans and is connected at each end to the edges of the sleeve 110. A solar panel is operationally related to the power source 602. Remote-control 636 is operated by a consumer 302. A remote-control interface 610 is operationally related to the lighting control panel 106 and wirelessly with the remote-control 636. The ambiance lighting system is operable by the consumer 302 by way of the remote-control 636. A communication interface 616 is operationally related to the microcontroller 642 and configured to data communicate with one or more of a remote data processing resource 504, a computing device 506, or wirelessly with other light control panels 106 associated with other ambiance lighting systems 100. In an exemplary embodiment, one or more of a light diverter 184 can be included in the ambiance lighting system kit 160.

Referring to FIGS. 18-20, there are illustrated examples of a light control panel 106. In an exemplary embodiment, a lighting control panel 106 can comprise a control system 600. The control system 600 operates the lighting in accordance with consumer 302 interaction. In this regard, the control system 600 can comprise and be operationally related to power source 602, activation circuit 604, LED interface 606, and LED lights 608. Reference 'A' is the top side of the lighting control panel 106 and reference 'B' is the bottom side of the lighting control panel 106.

In operation, the consumer 302 by way of the activation circuit 604 can perform turning on and off the LED(s), selecting the color of the LED lights, changing light attributes, selecting a program that dims, or flickers the LED(s) lights, or other features or functions as may be required and/or desired in a particular embodiment.

The activation circuit 604 can be a plurality of switches, a plurality of relays, a plurality of buttons, or other types of kind of activation circuits as may be required and/or desired in a particular embodiment.

The power source 602 can be alternating current (AC), direct current (DC), battery, solar panels, a combination thereof, and/or other types and kinds of power sources as may be required and/or desired in a particular embodiment.

The LED interface can be transistor-driven, multiplexed to drive a matrix of LED lights, current-regulated to control the amount of electrical current supplied to the LED lights to control brightness or interface to drive LED lights in other ways as may be required and/or desired in a particular embodiment.

The LED(s) lights 608 can be a plurality of single color LED, a plurality of red-green-blue type of LED(s) to produce different colors, a plurality of LED(s) that combine solid color and multi-color, or other types or kinds of LED(s) as may be required and/or desired in a particular embodiment.

Referring to FIG. 19, in an exemplary embodiment, the control system 600 can further comprise and be operationally related to the other features and functions such as a remote-control interface 610. The remote-control interface 610 can provide a wireless connection to a remote-control device 636 that is operable by the consumer 302. Such remote-control device can data communicate with the control system 600 by way of the remote-control interface 610 for operating the light control panel 106. Such operation can include turning the system and LED(s) 608 on and off, changing the LED(s) 608 color or changing other light quality attributes, selecting programmed features and functions of the system, and for other purposes as may be required and/or desired in a particular embodiment.

Referring to FIG. 20, there are illustrated examples of a light control panel 106. In an exemplary embodiment, the lighting control panel 106 can comprise a plurality of features including being web-enabled and operating as a web-enabled control system.

The term "web-enabled" or "web-enabled control system" or "web-enabled control system 600" in the present invention is intended to mean an Internet-of-things device. In this regard, a device such as the lighting control panel is equipped with a control system 600 that is capable of connecting a physical device such as the ambiance lighting system 100 to the digital world. Stated differently, web-enabling is equipping a device such as an ambiance lighting system 100 with the necessary electronics and firmware to be monitored, controlled, and data communicate locally and remotely with other data communicating devices. Such other data communicating devices can be smartphones, tablets, laptops, other web-enabled devices, servers, other ambiance lighting system 100, and other types or kinds of data communicating devices as may be required and/or desired in a particular embodiment.

In addition, such computing devices 506 can data communicate with remote data processing resources 504 and utilize data storage resources 502. Such data processing resources 504 can be a server, a database 502, or other types and kinds of data processing resources. Furthermore, computing devices 506, remote data processing resources 504, data storage resources 502, other ambiance lighting systems 100, and other types and kinds of data communicating devices can data communicate over a global network 500.

Remote agents 304 can also data communicate over the global network 500 to interact with a plurality of ambiance lighting systems 100, consumer computing devices, and other data processing resources as may be required and/or desired in a particular embodiment. Such remote agent 304 interaction can be to operate or program the ambiance lighting systems 100, interact with the consumer 302 when they are proximate the ambiance lighting system 100 through microphone 632 and speaker 614, or for other purposes as may be required and/or desired in a particular embodiment.

Such computing devices 506 can data communicate directly with the communication interface 616 or remotely over the global network 500. The global network 500 can be the Internet. Database 502 is operationally related to the data processing resource 504.

In an exemplary embodiment, the lighting control panel 106 can be equipped with a web-enabled control system 600. Such a web-enabled control system can comprise a microcontroller 642 which is operationally related to a plurality of communication interfaces 616, a power source 602, a remote-control interface 610, an audio interface 612, an activation circuit 604, general-purpose inputs and outputs (GPIO) interface 620, a memory 622, a camera interface 624, a plurality of sensors 626, an alarm 628, ambient condition sensors 630, a microphone 632, a global position system device 634, and a light-emitting diode (LED) interface 606.

The power source 602 can be further interconnected with a device charger 638 that is configured to charge digital devices such as a smartphone, laptop, tablet, or other digital devices as may be required and/or desired in a particular embodiment.

The audio interface 612 can be further interconnected with speaker(s) 614 and the LED interface 606 can be further interconnected with a plurality of LED lights 608.

The microcontroller 642 can be INTEL, ZILOG, MICROCHIP, AMD, ARM, and/or other types or kinds of microcontrollers.

The communication interfaces 616 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The GPIO 620 can be TTL, CMOS, transistors, buffers, relays, pushbutton, switch, and/or other types and of types and kinds of GPIO circuits.

The memory 622 can be combinations of random access memory (RAM), read-only memory (ROM), flash memory, hard drives, solid-state drives, USB flash drives, and/or other types and kinds of memory.

The camera interface 624 can be further interconnected with a plurality of cameras 640. Such plurality of cameras 640 can be 'local' meaning mount or otherwise attached to the ambient lighting system 100 or 'remote' meaning that the camera 640 is either tethered by wire with the camera interface 624 or forms a wireless connection with the camera interface 624.

In an exemplary embodiment, the camera interface 624 can be 'local' integrated into the ambiance lighting system 100 or can be 'remote' so that the camera 640 view is of the ambiance lighting system 100 and the surrounding area. Also, several cameras 640 can be utilized to create a network of camera 640 views that can monitor a broader area. Such multiple cameras 640 applications can include some cameras 640 that are 'local' integrated into the ambiance lighting system 100 and some cameras 640 that are 'remote'.

In an exemplary embodiment, the sensors 626 can be passive infrared sensor (PIR) motion sensors, infrared, thermal, Doppler radar, ultrasonic, capacitance, touch-type, optical, Hall effect, switch, fingerprint, light-detecting, and other types of biometric sensors, and/or other types and kinds of sensors.

In an exemplary embodiment, such light detecting sensor 626 application can be implement to have the lighting control board 106, LED(s) 608 turn 'on' automatically in dark environments like when the sun goes down and turn 'off' in light environments such as when the sun rises.

The alarm 628 can be noise, lights, relays, siren, horn, piezo buzzer, speaker, voice annunciations, and/or other types and kinds of alarms. For remote monitor applications, notifications can be sent to the consumer 302 or remote agents 304 when an alarm or other type of condition is detected.

The ambient condition sensors 630 can be temperature, moisture, humidity, sunlight, time, date, and/or other types and kinds of sensors.

The microphone 632 listens to noises and spoken language proximate the ambiance lighting system. Such listening can be used to remotely monitor, integrate with AMAZON ALEXA and similar type personal assistant web-enabled technologies, allow consumer 320 to talk with remote agents 304 or other remote persons, and for other purposes as may be required and/or desired in a particular embodiment. In this regard, speaker 614 can annunciate AMAZON ALEXA types of responses, play music, be a speaker 614 that is part of the event or location public address system, or other types or kinds of microphone/speaker applications as may be required and/or desired in a particular embodiment.

The global position system (GPS) device 634 can be used to determine the geographic location of the ambiance lighting system 100.

In operation, in an exemplary embodiment, the lighting control panel 106 can be equipped with a web-enabled control system 600 so that the ambiance lighting system 100 can be remotely monitored and controlled. Such remote monitoring and control can be effectuated by the remote agents 304, the consumer 302, a remote service provider, and/or by others as may be required and/or desired in a particular embodiment. Such remote service providers can be StudioCalathea.com or their agents, their partners, their service provider, an alarm monitoring company, a lighting company or event planning company, or other types and kinds of remote service providers as may be required and/or desires in a particular embodiment. In addition, such remote monitoring control can be by way of computing devices 506 or remote data processing resource 504.

Referring to FIG. 21, there is illustrated one example of an ambiance lighting system method. In an exemplary embodiment, the method begins in step 1002 where more than one of a translucent panel 104 can be interconnected by way of one or more of a panel connector 124, 126, or 150. The panel connector 124, 126, or 150 aligns and secures the translucent panels 104 forming a perimeter 132 having a top edge 138, a bottom perimeter 134, a bottom edge 140, and an interior region 136. The method then moves to step 1004.

In step 1004, a light control panel slides into one or more of a sleeve 110, the sleeve 110 having an open edge 148. The light control panel 106 comprises one or more light-emitting diode (LED) 608, and a power source 602. The light control panel 106 slides into the open edge 148 and is retained in sleeve 110. The sleeve 110 is secured across the top edge 138 or the bottom edge 140. The light control panel 106 is orientated within the sleeve 110 so that the LED(s) 608 illuminates the interior region 136 through the translucent panel creating an ambiance lighting effect. The method then moves to step 1006.

In step 1006, the ambiance lighting system is activated causing the LED(s) 608 to illuminate. The method then moves to step 1008.

In step 1008, the lighting ambiance is adjusted to the desired lighting effect. The method is then exited.

Referring to FIG. 22, there are illustrated exemplary embodiments of an ambiance lighting system 100. The following exemplary embodiment steps can be used interchangeably with the methods of the present invention.

In step 1102, the ambiance lighting system 100 can be operated by way of an activation control circuit 604, a remote-control 636, a computing device 506 such as a smartphone, or remotely by way of a remote data processing resource 504.

In step 1104, one or more of an accessory sleeve 102 is fastened to at least some of the translucent panels 104.

In step 1106, an ornamental accessory 158 is inserted into the accessory sleeve 102.

In step 1108, one or more Fresnel lens 112 is attached to at least one of the translucent panels 102 or the bottom translucent panel 152.

In step 1110, a bottom translucent panel 152 is attached to the bottom edge 140. The bottom translucent panel 152 comprises one or more of a Fresnel lens 112.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An ambiance lighting system comprising:
    more than one of a translucent panel having a front surface, a back surface, and more than one of an edge, each of the translucent panel is fabricated from a single layer of rigid material that is absent occlusions across the front surface or the back surface, and connected together temporarily and flexibly at more than one of the edge allowing an angle between each of the translucent panel to vary, forming a perimeter of different geometric shapes based on number of the translucent panel connected together, the perimeter having a top edge, and an interior region;
    a light control panel comprises one or more of a light-emitting diode (LED), and a power source; and
    one or more of a sleeve having an open edge, the light control panel is slidable in and out of the open edge, the light control panel is retained in the sleeve during use and removable from the sleeve when not in use, the sleeve is temporarily secured across the top edge of the translucent panel, the light control panel is orientated within the sleeve so that the LED illuminates the interior region projecting light through the translucent panel to create an ambiance lighting effect, the sleeve is removable from the top edge to allow each of the translucent panel, the light control panel, and the sleeve to be disassembled.

2. The ambiance lighting system in accordance with claim 1, further comprising:
    a solar panel operationally related to the power source.

3. The ambiance lighting system in accordance with claim 1, further comprising:
    remote control operated by a consumer; and
    a remote control interface is operationally related to the light control panel and wirelessly with the remote control, the ambiance lighting system is operable by the consumer by way of the remote control.

4. The ambiance lighting system in accordance with claim 1, the lighting control system further comprising:
    a microcontroller; and
    a communication interface operationally related to the microcontroller and configured to data communicate with one or more of a remote data processing resource, a computing device, or wirelessly other light control systems associated with other ambiance lighting systems.

5. The ambiance lighting system in accordance with claim 1, further comprising:
    a seal proximate to the open edge of the sleeve that when closed by a consumer creates a water resistance environment around the light control panel; and
    a handle spans and is connected at each end to edges of the sleeve.

6. The ambiance lighting system in accordance with claim 1, further comprising at least one of the following:
    one or more of a mirrored film; and
    one or more of a mirror shaper, the mirror shaper comprises a three-dimensional surface having one or more of an opening, the mirror shaper adheres to one or more of the translucent panel or a bottom panel, the mirrored film adheres to the three-dimensional surface of the mirror shaper, the mirror shaper when covered with the mirrored film redirects at least a portion of radiated light from the light control panel while selectively allowing partial light transmission through the mirrored film and the opening to enhance the ambiance lighting effect.

7. The ambiance lighting system in accordance with claim 1, further comprising:
    one or more of a panel fastener, at least some of the translucent panel having one more of a de-embossed recess, the panel fastener is fitted and secured into the de-embossed recess;
    one or more of a flap is formed along at least some of the edges of the sleeve, the flap extends beyond the perimeter; and
    a fastener is affixed to the flap, the fastener interconnects with the panel fastener securing the sleeve to the top edge or bottom edge of each of the translucent panel.

8. The ambiance lighting system in accordance with claim 1, further comprising:
    one or more of a fresnel lens; and
    a bottom panel is attached across the bottom edge and one or more of the fresnel lens is secured to one or more of the translucent panel or the bottom panel, wherein the fresnel lens projects patterns of light onto surfaces proximate to the ambient lighting system to enhance the ambiance lighting effect.

9. An ambiance lighting system comprising:
    more than one of a translucent panel having a front surface, a back surface, and more than one of an edge, each of the translucent panel is fabricated from a single layer of rigid material that is absent occlusions across the front surface or the back surface;
    one or more of a panel connector aligns and interconnects each of the translucent panel temporarily and flexibly at more than one of the edge allowing an angle between each of the translucent panel to vary, forming a perimeter of different geometric shapes based on number of the translucent panel connected together, the perimeter having a top edge, a bottom edge, an interior region;
    a light control panel comprising one or more of a light-emitting diode (LED), and a power source;
    one or more of a sleeve having an open edge, the light control panel is slidable in and out of the open edge, the light control panel is retained in the sleeve during use and removable from the sleeve when not in use, the sleeve is temporarily secured across the top edge of the translucent panel, the light control panel is orientated within the sleeve so that the LED illuminates the interior region projecting light through the translucent panel to create an ambiance lighting effect, the sleeve is removable from the top edge to allow each of the translucent panel, the panel connector, the light control panel, and the sleeve to be disassembled; and
    one or more of a fresnel lens is secured to at least one of the translucent panel or a bottom panel, wherein the fresnel lens projects patterns of light onto surfaces proximate to the ambient lighting system to enhance the ambiance lighting effect.

10. The ambiance lighting system in accordance with claim 9, the panel connector further comprising:
   a rigid frame having a u-shaped groove configured for receiving the top edge or the bottom edge holds each of the translucent panel in position.

11. The ambiance lighting system in accordance with claim 10, the panel connector further comprising:
   a plurality of hinges located at one or more of the edge where each of the translucent panel intersects.

12. The ambiance lighting system in accordance with claim 9, further comprising:
   one or more of a panel fastener, at least some of the translucent panel having one more of a de-embossed recess, the panel fastener is fitted and secured into the de-embossed recess;
   one or more of a flap is formed along at least some of the edges of the sleeve, the flap extends beyond the perimeter; and
   a fastener is affixed to the flap, the fastener interconnects with the panel fastener securing the sleeve to the top edge or bottom edge of each of the translucent panel.

13. The ambiance lighting system in accordance with claim 12, the panel fastener is one or more of an adhesive strip, one or more of a magnet, or one or more of a hook-and-loop.

14. The ambiance lighting system in accordance with claim 9, further comprising:
   one or more of a mirrored film; and
   one or more of a mirror shaper, the mirror shaper comprises a three-dimensional surface having one or more of an opening, the mirror shaper adheres to one or more of the translucent panel or a bottom panel, the mirrored film adheres to the three-dimensional surface of the mirror shaper, the mirror shaper when covered with the mirrored film redirects at least a portion of radiated light from the light control panel while selectively allowing partial light transmission through the mirrored film and the opening to create the ambiance lighting effect.

15. The ambiance lighting system in accordance with claim 9, further comprises:
   one or more of an accessory sleeve is secured to the front surface or the back surface of one or more of the translucent panel; and
   one or more of an ornamental accessory having a plurality of apertures therethrough slides into one or more of the accessory sleeve, wherein radiated light from the light control panel originating in the interior region passes through the plurality of apertures and is viewable from outside the ambiance lighting system to enhance the ambiance lighting effect.

16. The ambiance lighting system in accordance with claim 9, the perimeter having a top perimeter edge formed by the top edge of each of the translucent panel and a bottom perimeter edge formed by the bottom edge of each of the translucent panels, the top perimeter edge is greater in length than the bottom perimeter edge creating a tapered ambiance lighting system appearance.

17. The ambiance lighting system in accordance with claim 9, one or more of the ambiance lighting system is inserted into a secondary lighting fixture.

18. An ambiance lighting system kit comprising:
   more than one of a translucent panel having a front surface, a back surface, and more than one of an edge, each of the translucent panel is fabricated from a single layer of rigid material that is absent occlusions across the front surface or the back surface;
   one or more of a panel connector aligns and interconnects each of the translucent panel temporarily and flexibly at more than one of the edge allowing an angle between each of the translucent panel to vary, forming a perimeter of different geometric shapes based on number of the translucent panel connected together, the perimeter having a top edge, a bottom edge, and an interior region;
   one or more of a light control panel comprising one or more of a light-emitting diode (LED), and a power source;
   one or more of a sleeve having an open edge, the light control panel is slidable in and out of the open edge, the light control panel is retained in the sleeve during use and removable from the sleeve when not in use, the sleeve is temporarily secured across the top edge of the translucent panel, the light control panel is orientated within the sleeve so that the LED illuminates the interior region projecting light through the translucent panel to create an ambiance lighting effect, the sleeve is removable from the top edge to allow each of the translucent panel, the panel connector, the light control panel, and the sleeve to be disassembled;
   one or more of an accessory sleeve is secured to the front surface or the back surface of one or more of the translucent panel; and
   one or more of an ornamental accessory having a plurality of apertures therethrough slides into one or more of the accessory sleeve, wherein radiated light from the light control panel originating from the interior region passes through the plurality of apertures and is viewable from outside the ambiance lighting system to enhance the ambiance lighting effect.

19. The ambiance lighting system kit in accordance with claim 18, at least one of the following is included in the ambiance lighting system kit:
   a bottom panel is attached across the bottom edge;
   one or more of a fresnel lens is secured to one or more of the translucent panel, or the bottom panel, wherein the fresnel lens projects patterns of light onto surfaces proximate to the ambient lighting system;
   one or more of a panel fastener is secured to at least some of the translucent panel;
   the panel fastener is one or more of an adhesive strip that spans one or more of the edge of the translucent panel, one or more of a magnet, or one or more of a hook-and-loop;
   the panel fastener is a rigid frame having a u-shaped groove configured for receiving the top edge or the bottom edge, the u-shaped groove holds each of the translucent panel in position;
   the panel fastener further comprises a plurality of hinges located at one or more of the edges where each of the translucent panel intersects;
   one or more of the translucent panel is curvilinear in shape
   one or more of the translucent panel or the bottom panel is mirrored;
   one or more of a mirrored panel for adhering to one or more of the translucent panel or the bottom panel;
   one or more of a mirrored film for adhering to one or more of the translucent panel or the bottom panel;
   one or more of a mirror shaper for adhering to one or more of the translucent panel or the bottom panel and the mirrored film for adhering to the mirror shaper;
   one or more of a flap is formed along at least some of the edges of the sleeve, the flap extends beyond the perimeter;

a fastener is affixed to the flap, the fastener interconnects with the panel fastener securing the sleeve to the top edge or bottom edge of each of the translucent panel;

one or more of the translucent panel having one or more fastener holes, the panel fastener is fitted into the fastener hole;

a seal proximate the open edge of the sleeve that when closed by a consumer creates a water-resistance environment around the light control panel;

a handle spans and is connected at each end to edges of the sleeve;

a solar panel operationally related to the power source;

a remote control operated by a consumer;

a remote control interface is operationally related to the light control panel and wirelessly with the remote control, the ambiance lighting system is operable by the consumer by way of the remote control;

a microcontroller; or a communication interface is operationally related to the microcontroller and configured to data communicate with one or more of a remote data processing resource, a computing device, or wirelessly with other light control panels associated with other ambiance lighting systems.

20. The ambiance lighting system kit in accordance with claim 18, further comprising:

one or more of a mirrored film; and one or more of a mirror shaper, the mirror shaper comprises a three-dimensional surface having one or more of an opening, the mirror shaper adheres to one or more of the translucent panel or a bottom panel, the mirrored film adheres to the three-dimensional surface of the mirror shaper, the mirror shaper when covered with the mirrored film redirects at least a portion of radiated light from the light control panel while selectively allowing partial light transmission through the mirrored film and the opening to enhance the ambiance lighting effect.

* * * * *